United States Patent
Thomee et al.

(10) Patent No.: US 9,881,075 B2
(45) Date of Patent: Jan. 30, 2018

(54) METHOD AND APPARATUS FOR ACCURATE LOCALIZATION OF POINTS OF INTEREST USING A WORLD SHAPE

(71) Applicant: EXCALIBUR IP, LLC, New York, NY (US)

(72) Inventors: Bart Thomee, San Francisco, CA (US); David Ayman Shamma, San Francisco, CA (US)

(73) Assignee: EXCALIBUR IP, LLC, New York, NY (US)

(*) Notice: Subject to any disclaimer, the term of this patent is extended or adjusted under 35 U.S.C. 154(b) by 582 days.

(21) Appl. No.: 14/339,965

(22) Filed: Jul. 24, 2014

(65) Prior Publication Data
US 2015/0039631 A1 Feb. 5, 2015

Related U.S. Application Data

(63) Continuation-in-part of application No. 13/954,129, filed on Jul. 30, 2013, now Pat. No. 9,390,104.

(51) Int. Cl.
*G06F 17/30* (2006.01)

(52) U.S. Cl.
CPC .. *G06F 17/30663* (2013.01); *G06F 17/30241* (2013.01); *G06F 17/30256* (2013.01)

(58) Field of Classification Search
CPC ............ G06K 9/00013; G06K 9/3208; G06F 17/30256
See application file for complete search history.

(56) References Cited

U.S. PATENT DOCUMENTS

| | | | | |
|---|---|---|---|---|
| 6,246,412 B1* | 6/2001 | Shum | ............ | G06T 15/10 345/419 |
| 2008/0268876 A1* | 10/2008 | Gelfand | ............ | G06Q 30/02 455/457 |
| 2013/0238235 A1* | 9/2013 | Kitchel | ............ | G01C 21/32 701/412 |

OTHER PUBLICATIONS

Chen et al. ("Visual Summaries of Popular Landmarks from Community Photo Collections"), 2009, pp. 1248-1255.*

* cited by examiner

*Primary Examiner* — Alexander Khong
(74) *Attorney, Agent, or Firm* — James J. DeCarlo; Greenberg Traurig, LLP

(57) ABSTRACT

Geo-referenced and oriented media items may be used to determine a location of one or more points of interest depicted by the media items. A difference between an actual capture location and orientation and a reported location and orientation may be modeled according to one or more distributions, which distribution(s) may be used to assign one or more weights to each location in the world where such weight(s) may be considered to be a likelihood that a point of interest might have been seen by a capturing device. A density map may be acquired by superimposing the derived likelihoods, and a maximum, e.g., local maximum, may be determined to represent a location of a point of interest.

21 Claims, 19 Drawing Sheets

$a$ = semi-major axis of the ellipsoid
$b$ = semi-minor axis of the ellipsoid
$f$ = flattening of the ellipsoid = $\frac{a-b}{a}$
$\lambda_1$ = longitude of 1st point
$\phi_1$ = latitude of 1st point
$\lambda_2$ = longitude of 2nd point
$\phi_2$ = latitude of 2nd point
$\Delta\lambda$ = $\lambda_2 - \lambda_1$
$U_1$ = reduced latitude of 1st point = $\text{atan}((1-f)\tan\phi_1)$
$U_2$ = reduced latitude of 2nd point = $\text{atan}((1-f)\tan\phi_2)$
$\epsilon$ = quality of approximation threshold, e.g. $10^{-12}$
$\iota$ = iteration threshold, e.g. 100

Given these definitions the algorithm is as follows:

$\lambda = \Delta\lambda$
$i = 0$ do

$\sin\sigma = \sqrt{(\cos U_2 \sin\lambda)^2 + (\cos U_1 \sin U_2 - \sin U_1 \cos U_2 \cos\lambda)^2}$
$\cos\sigma = \sin U_1 \sin U_2 + \cos U_1 \cos U_2 \cos\lambda$
$\sigma = \text{atan2}(\sin\sigma, \cos\sigma)$
$\alpha = \text{asin}\left(\frac{\cos U_1 \cos U_2 \sin\lambda}{\sin\sigma}\right)$
$\beta = \begin{cases} 0, & \text{if } \cos^2\alpha = 0 \\ \cos\sigma - \frac{2\sin U_1 \sin U_2}{\cos^2\alpha}, & \text{otherwise} \end{cases}$
$C = \frac{f}{16}\cos^2\alpha(4 + f(4 - 3\cos^2\alpha))$
$\lambda' = \lambda$
$\lambda = \Delta\lambda + (1-C)f\sin\alpha\{\sigma + C\sin\sigma[\beta + C\cos\sigma(-1 + 2\beta^2)]\}$
$i = i + 1$ while $\left|\frac{\lambda - \lambda'}{\lambda}\right| > \epsilon$ and $i < \iota$ $u = \frac{a^2 - b^2}{b^2}\cos^2\alpha$
$A = 1 + \frac{u}{16384}\{4096 + u[-768 + u(320 - 175u)]\}$
$B = \frac{u}{1024}\{256 + u[-128 + u(74 - 47u)]\}$
$s = B\sin\sigma\{\beta + \frac{B}{4}[\cos\sigma(-1 + 2\beta^2) - \frac{B}{6}\beta(-3 + 4\sin^2\sigma)(-3 + 4\beta^2)]\}$ Once the algorithm finishes, we compute the geodetic distance $\delta$ between the two locations, as $\delta = bA(\sigma - s)$ and the initial bearing $\theta$ as $\theta = \begin{cases} \text{atan2}\left(\frac{\cos U_2 \sin\lambda}{\cos U_1 \cos U_2 - \sin U_1 \cos U_2 \cos\lambda}\right) \bmod 360°, & \text{if } i < \iota \\ 180°, & \text{if } i = \iota \text{ and } \phi_1 > \phi_2 \\ 0°, & \text{if } i = \iota \text{ and } \phi_1 < \phi_2 \\ \text{undefined}, & \text{otherwise} \end{cases}$ where the modulo operation restricts the bearing to the range $0 \leq \theta < 360$.

FIGURE 13

METHOD AND APPARATUS FOR ACCURATE LOCALIZATION OF POINTS OF INTEREST USING A WORLD SHAPE

CROSS REFERENCE TO RELATED APPLICATION

This application is a continuation-in-part and claims the benefit of U.S. patent application Ser. No. 13/954,129 filed Jul. 30, 2013 and entitled "METHOD AND APPARATUS FOR ACCURATE LOCALIZATION OF POINTS OF INTEREST", the contents of which are incorporated herein by reference.

FIELD OF THE DISCLOSURE

The present disclosure relates to geographic locations of points of interest, and more particularly to determining a geographic location of a point of interest using georeferenced, or geotagged, and oriented media items.

BACKGROUND

In the last few years digital media capturing devices, such as photo cameras and mobile phones, have increasingly been equipped with global position system (GPS) chips, enabling media items, such as without limitation photographs, videos, etc., to be associated with a geographic location. Such georeferenced, or geotagged, digital media are increasingly forming part of the media items, e.g., photographs, still images, video, etc., being taken, uploaded and shared. Nonetheless, the location associated with such a media item refers to the location at which it was captured, i.e., the location of the digital media capturing device, rather than the location(s) of a point of interest (POI) depicted in the media item.

SUMMARY

The present disclosure seeks to address failings in the art and to use capture information including location and orientation information, which information may be provided by the digital media capturing device(s), to determine or estimate a location of an object that is depicted in the media item. In accordance with one or more embodiments, capture information including location and orientation information, which orientation information may be used relative to true or magnetic north and may be captured at the time that the media item is captured, may be used to accurately estimate the location of a depicted object, e.g., a POI.

In accordance with one or more embodiments, georeferenced and oriented media items taken close to each other may be accumulated and a most likely geographic location of a point of interest may be inferred by tracing the lines of sight originating from the capturing device's location along its orientation. Measurement inaccuracies associated with both geo-location and geo-orientation may be accounted for during a location estimation process. More specifically and in accordance with one or more embodiments, a difference between an actual capture location and orientation, which location and orientation may be associated with any point in the world, and a reported location and orientation can be modeled according to a distribution, such as and without limitation a bivariate Weibull, Rayleigh, Gamma or Gaussian distribution, and each location in the world may be weighed by the likelihood it could have been seen by the camera. By doing this for a plurality of media items and superimposing derived likelihoods, a density map may be generated where each local maximum surpassing some threshold can be considered a point of interest. In accordance with one or more embodiments, more popular points of interest may have more support than lesser points of interest.

In accordance with one or more embodiments, a method is provided, the method comprising selecting, using at least one computing system, a plurality of digital media items, each media item of the plurality having associated capture information identifying a location and orientation of a digital media device capturing the media item; generating, using the at least one computing system, a plurality of weights for each media item in the plurality, each weight of the media item's plurality of weights corresponding to a geographic location of a plurality of geographic locations, the weight reflects an estimated inaccuracy in the identified location and orientation of the digital media device and is generated using information including the media item's identified location and orientation, the generated weight for use in determining whether a point of interest depicted in the media item is located at the geographic location, the plurality of weights being determined based on a world shape; and for each geographic location of the plurality, aggregating, using the at least one computing system, the plurality of weights generated for the geographic location in connection with each media item of the plurality of media items, an aggregated weight for a given geographic location identifying a probability that at least one point of interest is located at the given geographic location.

In accordance with one or more embodiments a system is provided, which system comprises at least one computing device comprising one or more processors to execute and memory to store instructions to select a plurality of digital media items, each media item of the plurality having associated capture information identifying a location and orientation of a digital media device capturing the media item; generate a plurality of weights for each media item in the plurality, each weight of the media item's plurality of weights corresponding to a geographic location of a plurality of geographic locations, the weight reflects an estimated inaccuracy in the identified location and orientation of the digital media device and is generated using information including the media item's identified location and orientation, the generated weight for use in determining whether a point of interest depicted in the media item is located at the geographic location, the plurality of weights being determined based on a world shape; and for each geographic location of the plurality, aggregating, use the at least one computing system, the plurality of weights generated for the geographic location in connection with each media item of the plurality of media items, an aggregated weight for a given geographic location identifying a probability that at least one point of interest is located at the given geographic location.

In accordance with yet another aspect of the disclosure, a computer readable non-transitory storage medium is provided, the medium for tangibly storing thereon computer readable instructions that when executed cause at least one processor to select a plurality of digital media items, each media item of the plurality having associated capture information identifying a location and orientation of a digital media device capturing the media item; generate a plurality of weights for each media item in the plurality, each weight of the media item's plurality of weights corresponding to a geographic location of a plurality of geographic locations, the weight reflects an estimated inaccuracy in the identified location and orientation of the digital media device and is generated using information including the media item's identified location and orientation, the generated weight for use in determining whether a point of interest depicted in the media item is located at the geographic location, the plurality of weights being determined based on a world shape; and for each geographic location of the plurality, aggregating, use the at least one computing system, the plurality of weights generated for the geographic location in connection with each media item of the plurality of media items, an aggregated weight for a given geographic location identifying a probability that at least one point of interest is located at the given geographic location.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of an intersection of multiple lines of sight associated with multiple digital media capturing devices.

FIG. 2 provides an example of multiple intersection points that may occur where location and orientation measurements provided by multiple digital media capturing devices are imprecise.

FIG. 3 provides an example of an isosceles triangle formed in accordance with one or more embodiments.

Figure 6:
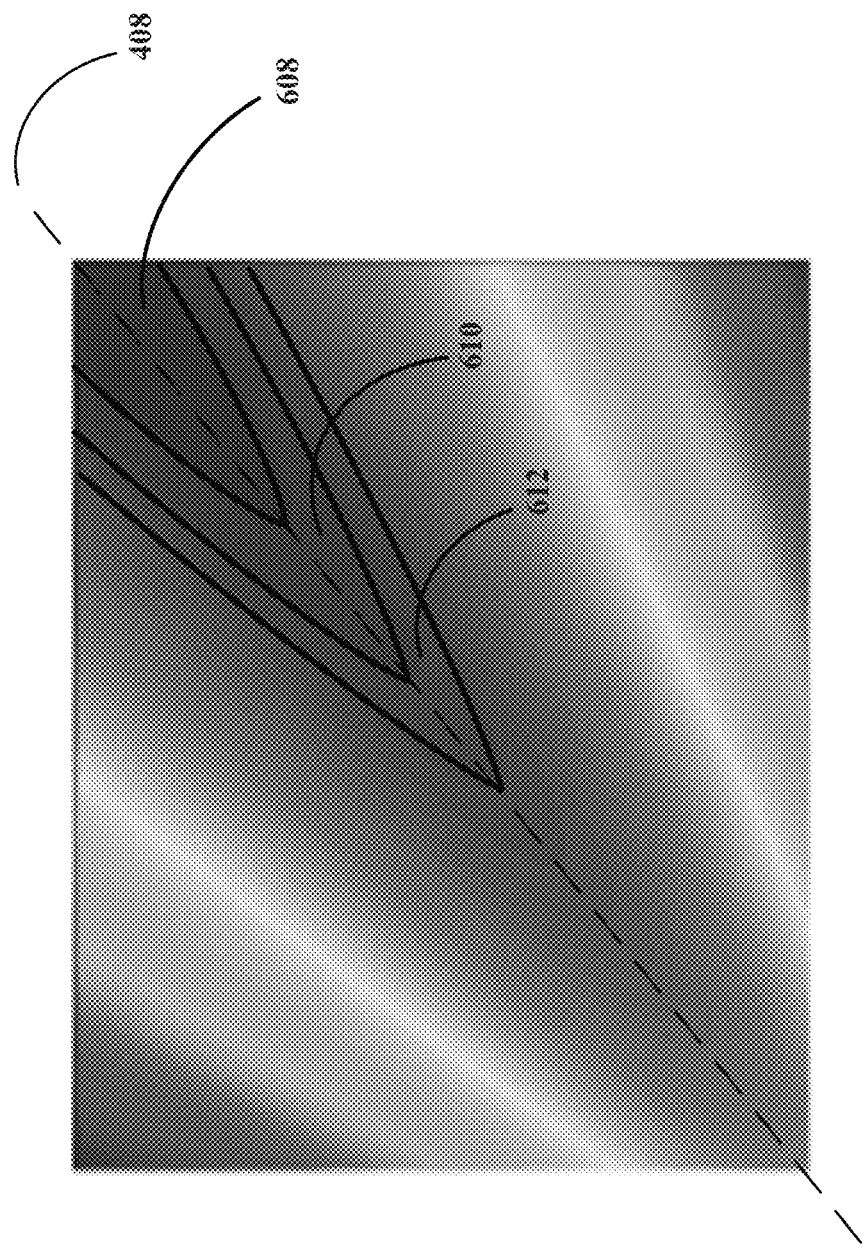

FIG. 6 provides an example of a modeling of the convolved weights in accordance with one or more embodiments of the present disclosure.

Figure 7:
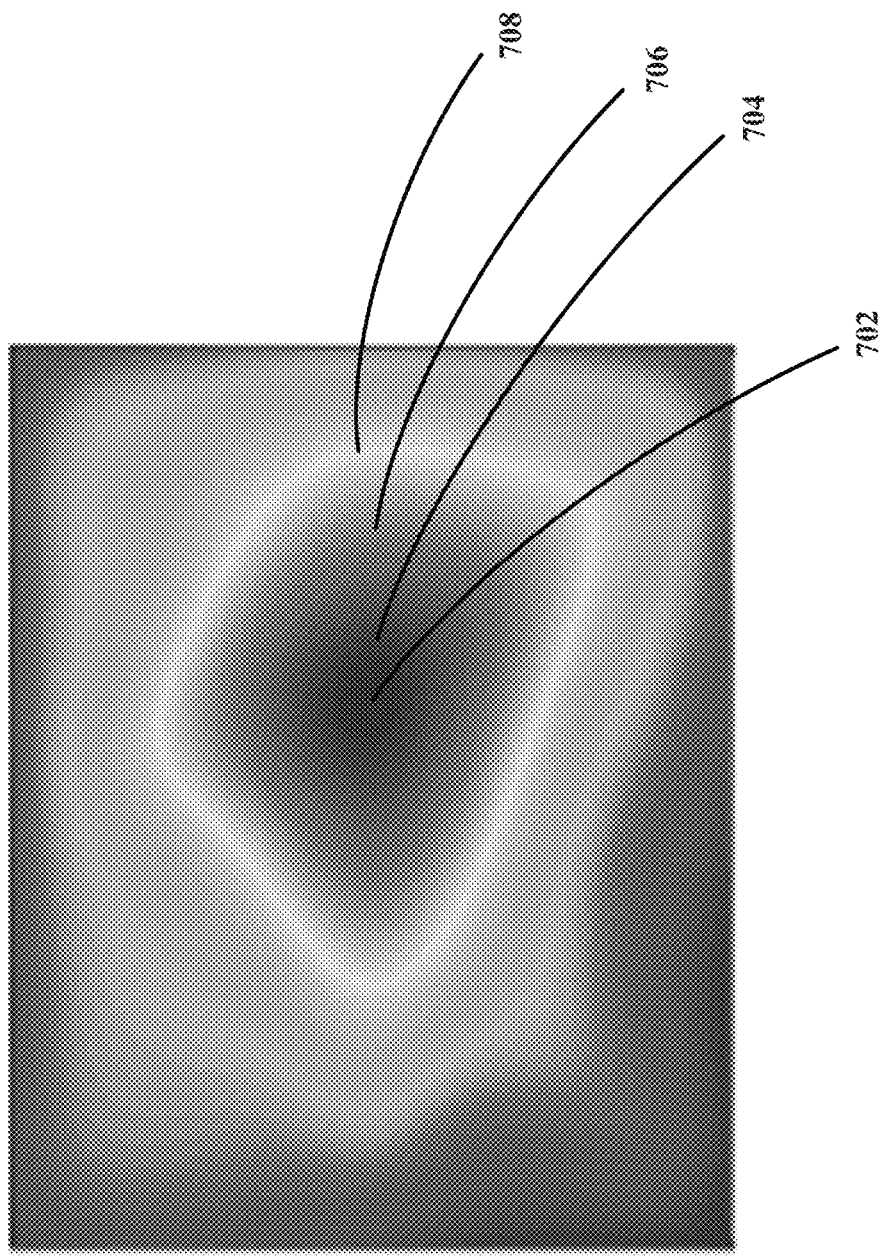

FIG. 7 provides an example of a density mapping formed from aggregated convolved weights associated with a number of photos in accordance with one or more embodiments of the present disclosure.

Figure 8A:
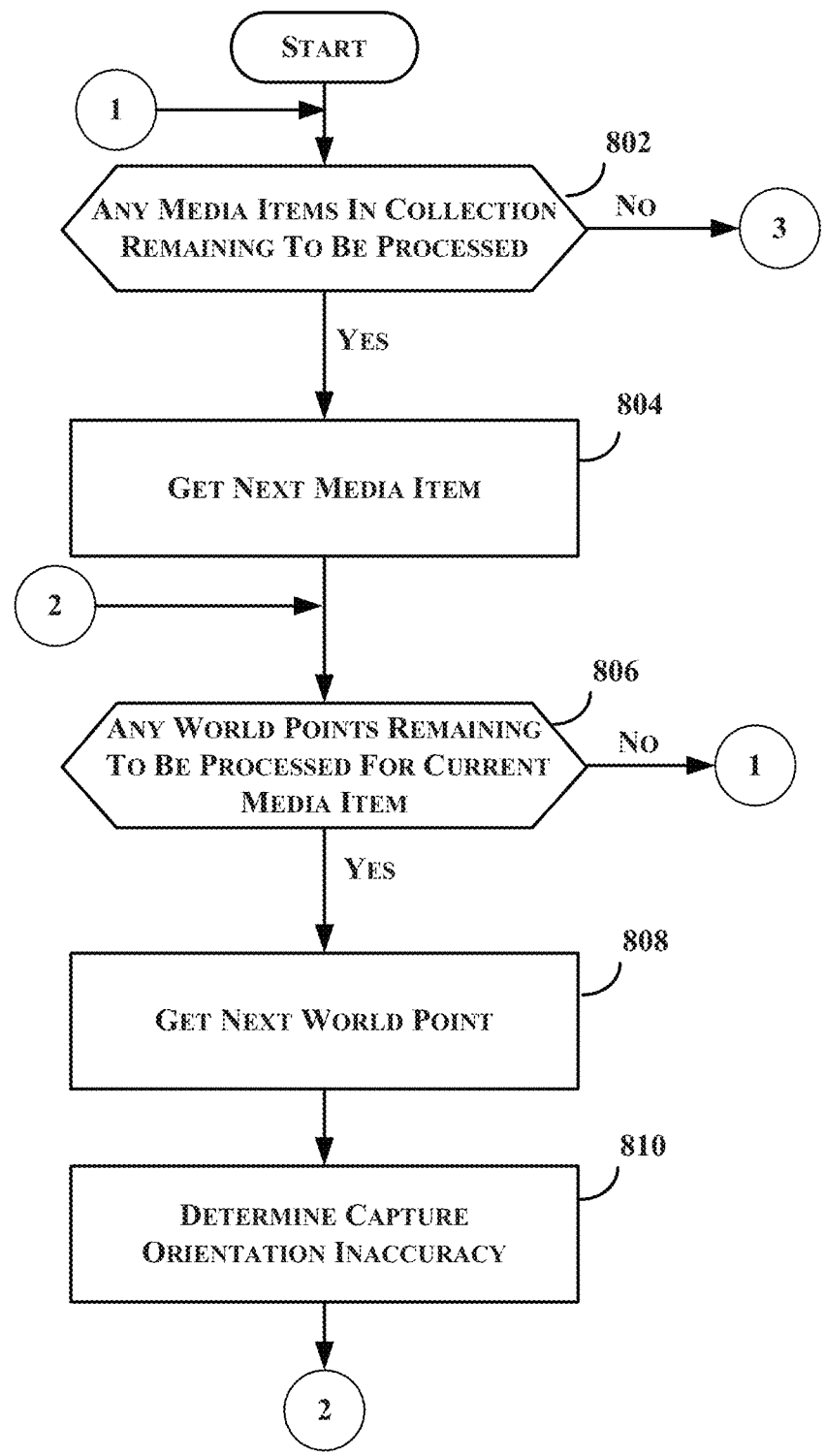
Figure 8B:
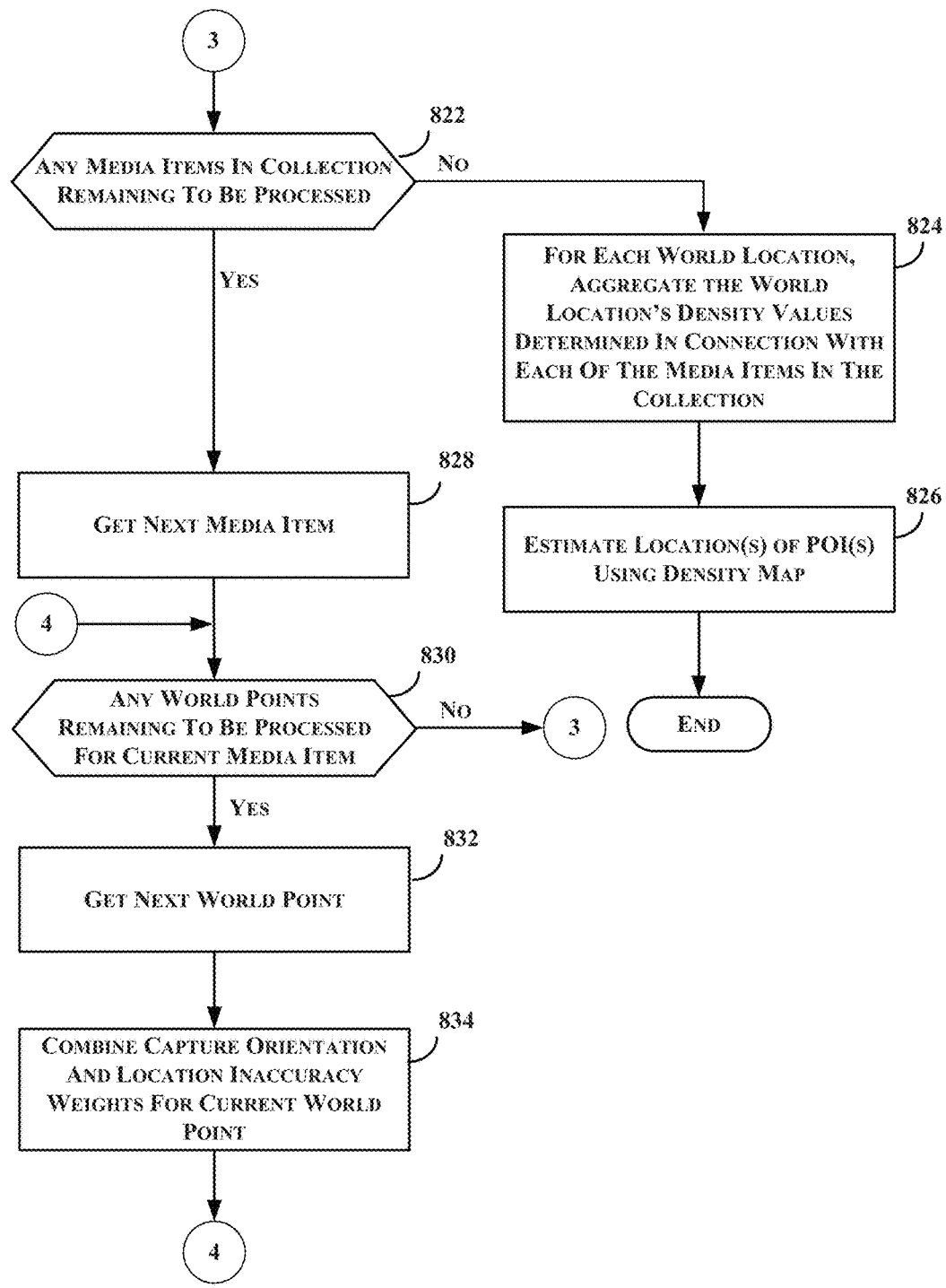

FIG. 8, which comprises FIGS. 8A and 8B, provides an example process flow to assign weight(s) to world locations in accordance with one or more embodiments of the present disclosure.

Figure 9A:
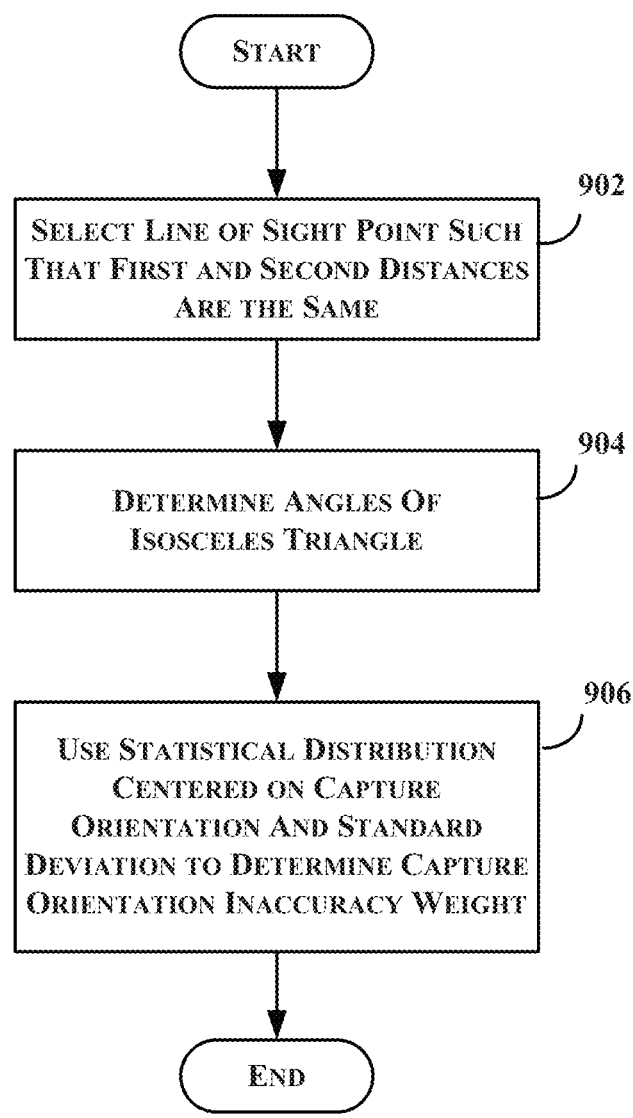
Figure 9B:
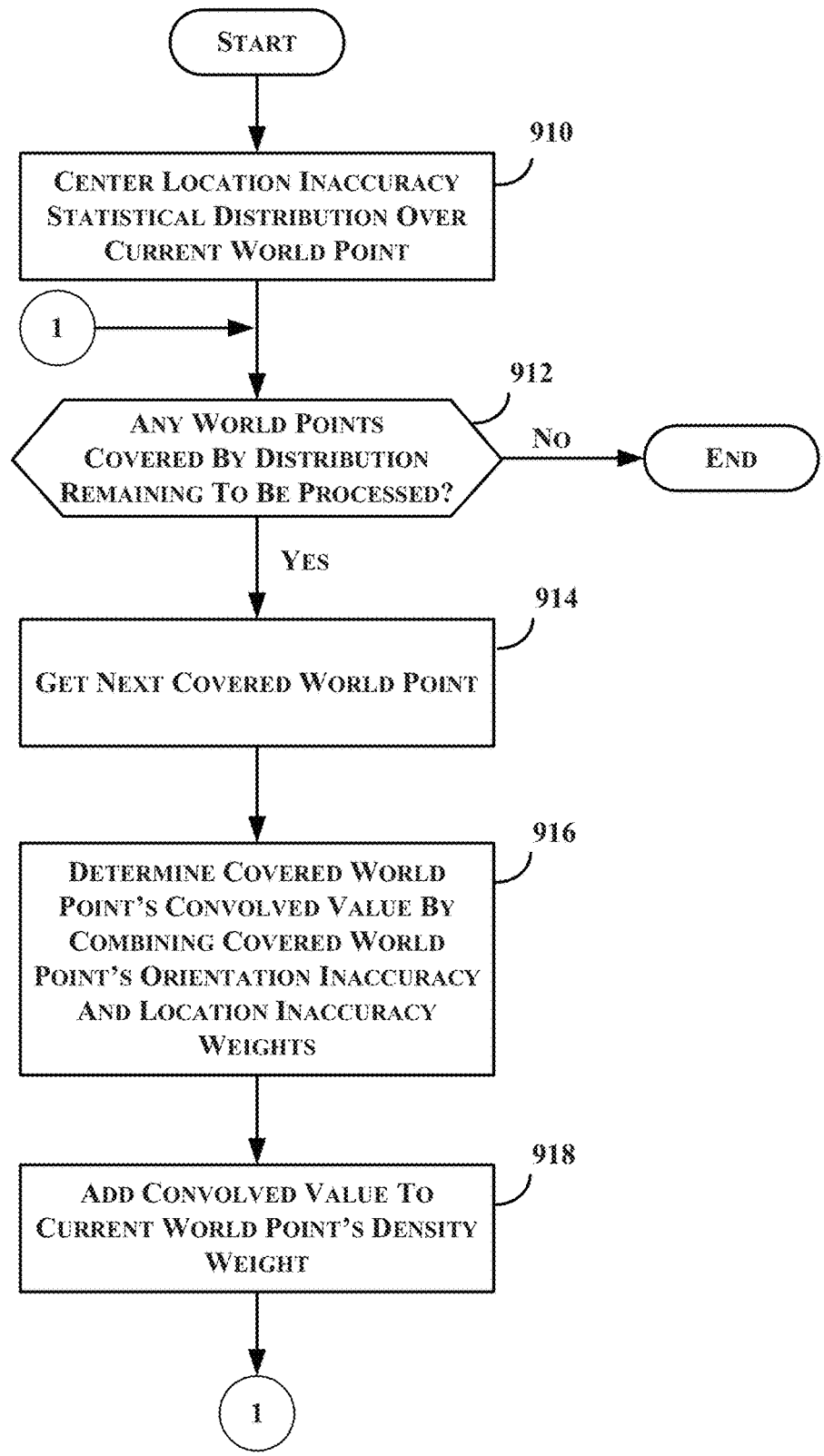

FIG. 9, which comprises FIGS. 9A and 9B, provides process flow examples for use in determining capture orientation and location inaccuracy weights and density weights in accordance with one or more embodiments.

Figure 10:
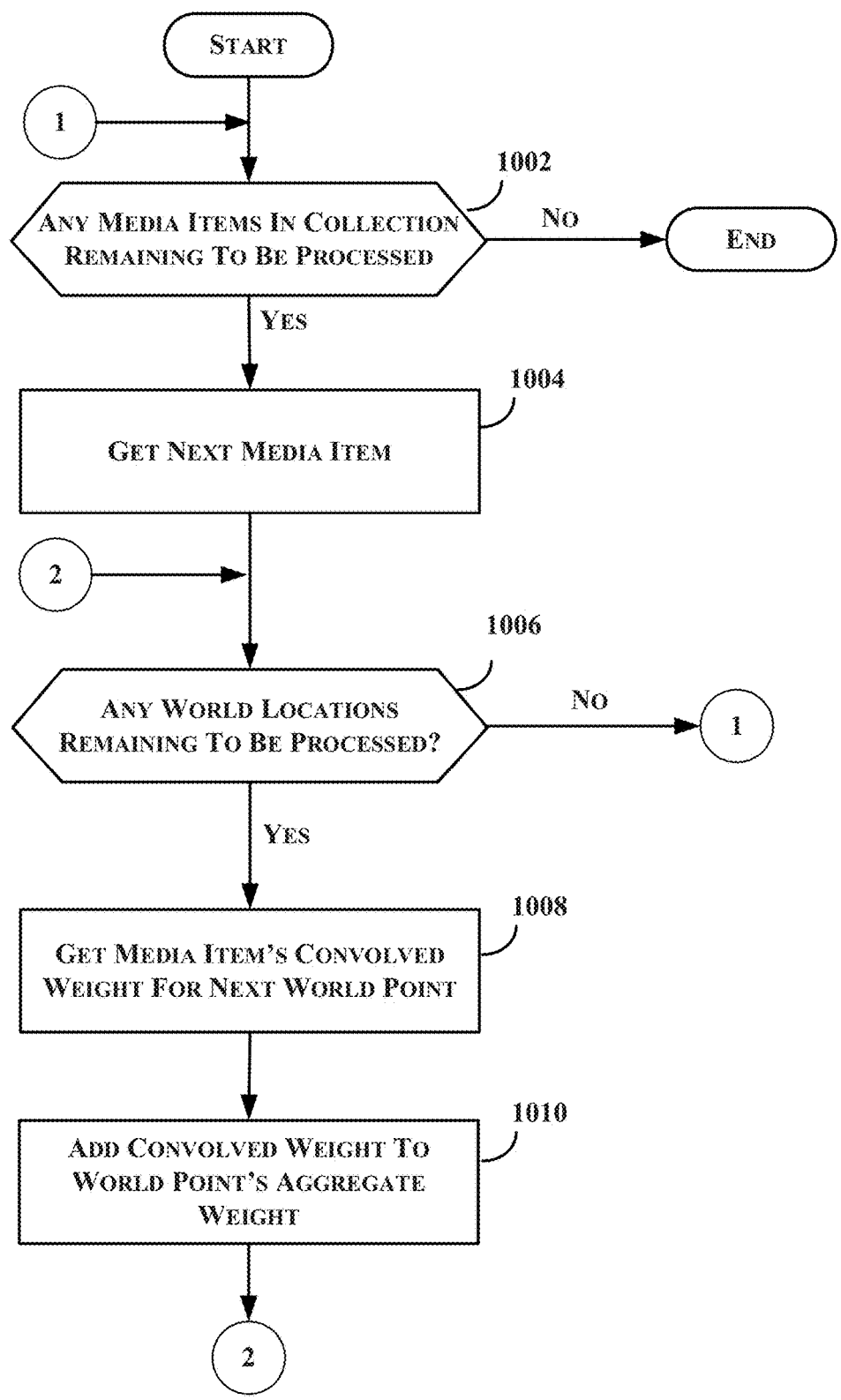

FIG. 10 provides a weight aggregation process flow in accordance with one or more embodiments of the present disclosure.

Figure 11:
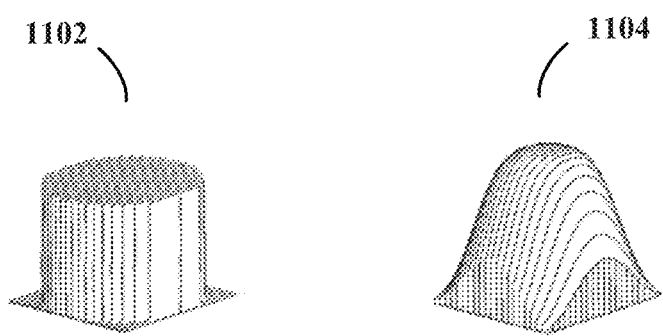

FIG. 11 provides examples of flat and Gaussian kernels in accordance with one or more embodiments of the present disclosure.

Figure 12:
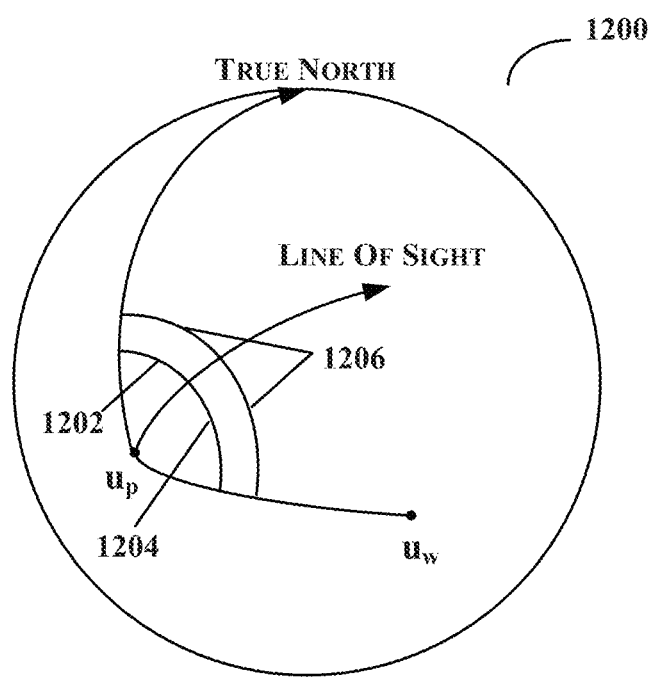

FIG. 12 is illustrative of a capture point and a world point on the surface of the planet, which points may be used in accordance with one or more embodiments of the present disclosure.

FIG. 13 provides an example of an implementation of Vincenty's iterative inverse formula used in accordance with one or more embodiments of the present disclosure.

Figure 14:
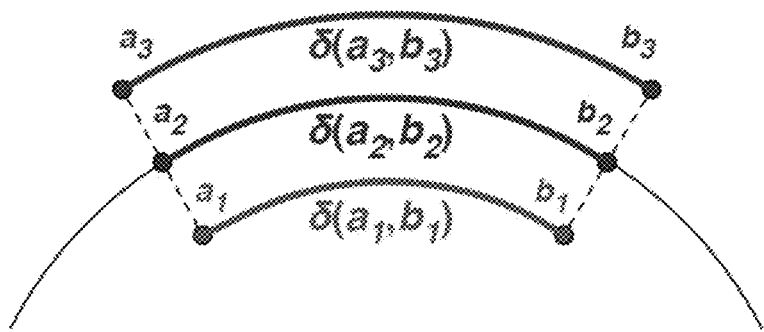

FIG. 14 provides an example of horizontal distances between two points dependent on elevation, or vertical location, in accordance with one or more embodiments of the present disclosure.

Figure 15A:
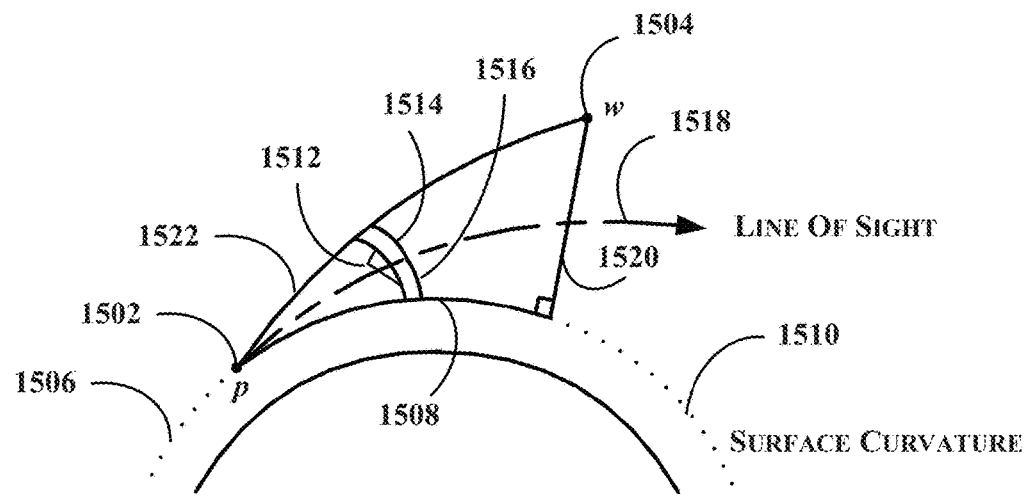
Figure 15B:
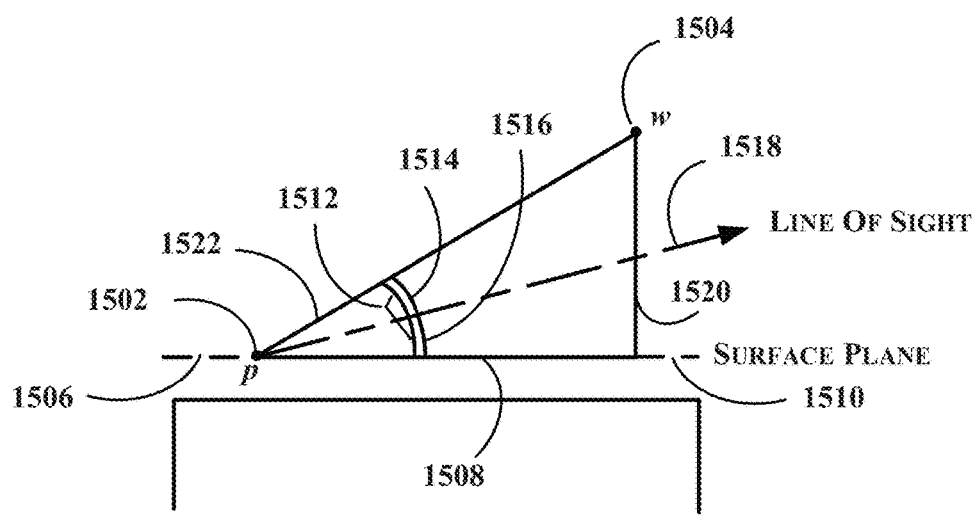

FIG. 15, which comprises FIGS. 15A and 15B, provide examples of determining horizontal and vertical distances and vertical orientation in accordance with one or more embodiments of the present disclosure.

Figure 16:
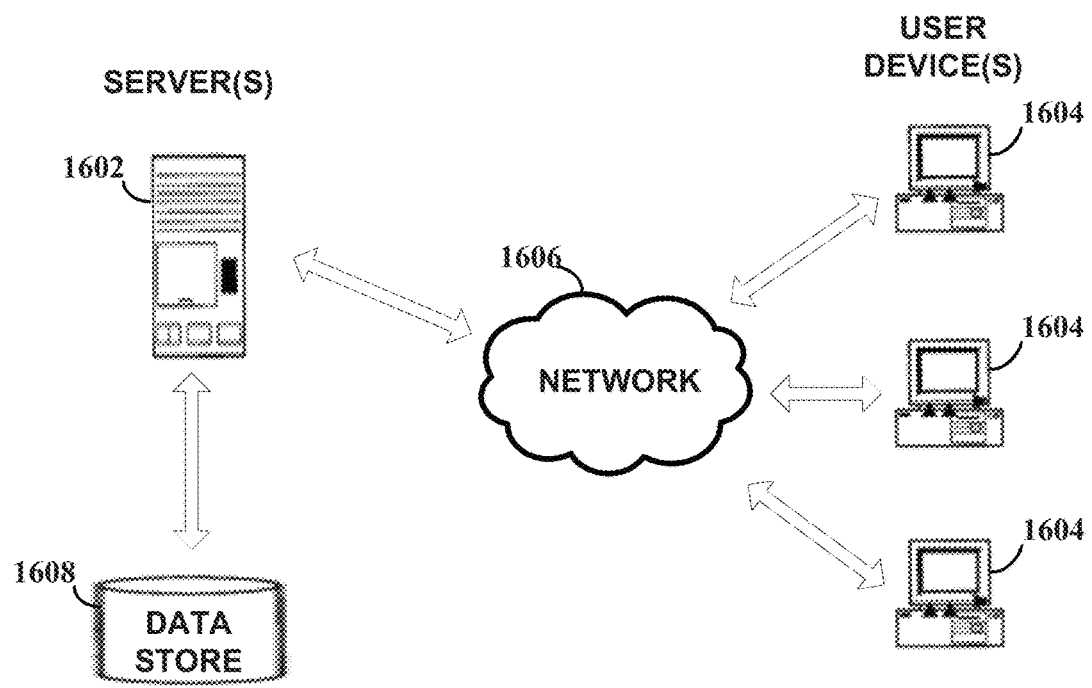

FIG. 16 illustrates some components that can be used in connection with one or more embodiments of the present disclosure.

Figure 17:
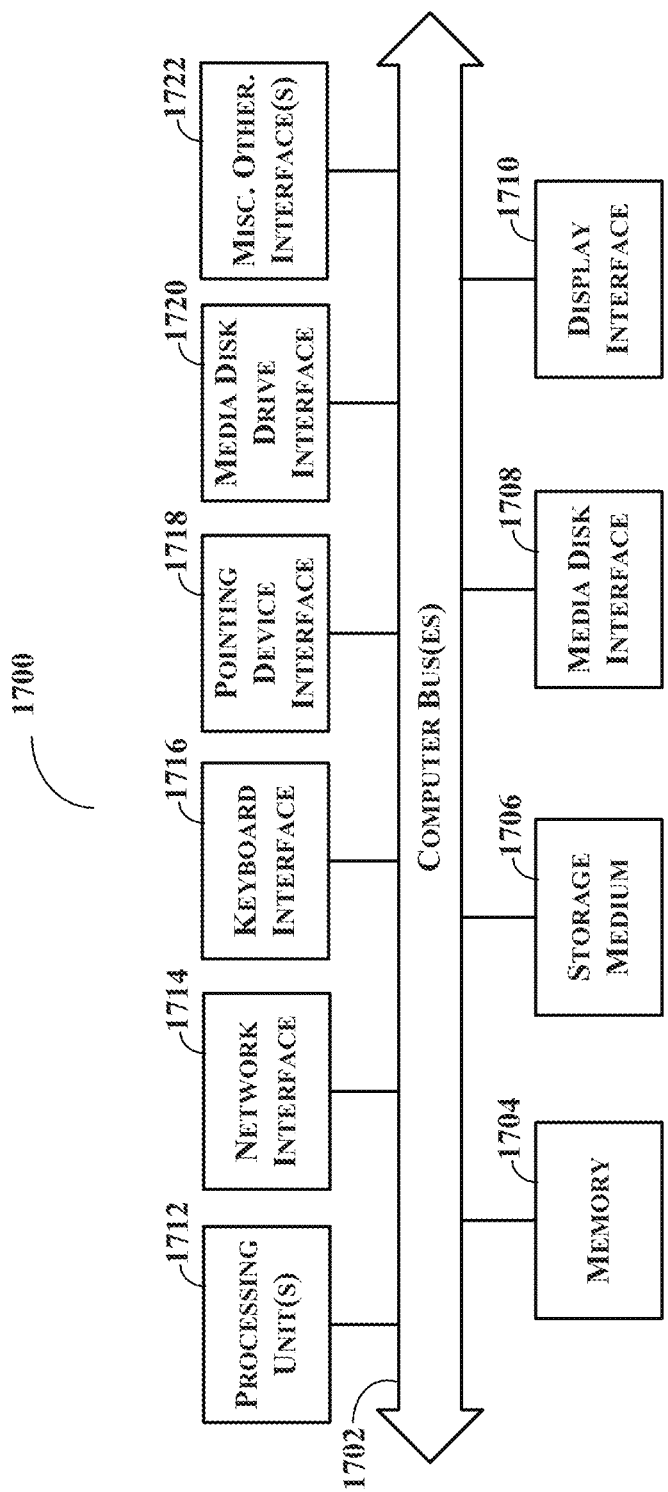

FIG. 17 is a detailed block diagram illustrating an internal architecture of a computing device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture for accurate estimation of geolocation and geo-orientation for points of interest using georeferenced and oriented media items depicting the points of interest.

In accordance with one or more embodiments, a compass direction supplied by the digital media capturing device may be used to compute the intersections between the lines of sight originating from the devices focusing on the same scene, so that the locations of the points of interest depicted in the scene may be predicted. The accuracy of the devices that supply the geographic coordinates and the compass direction may vary and these imprecision's may be taken into account when estimating a location.

Figure 1:
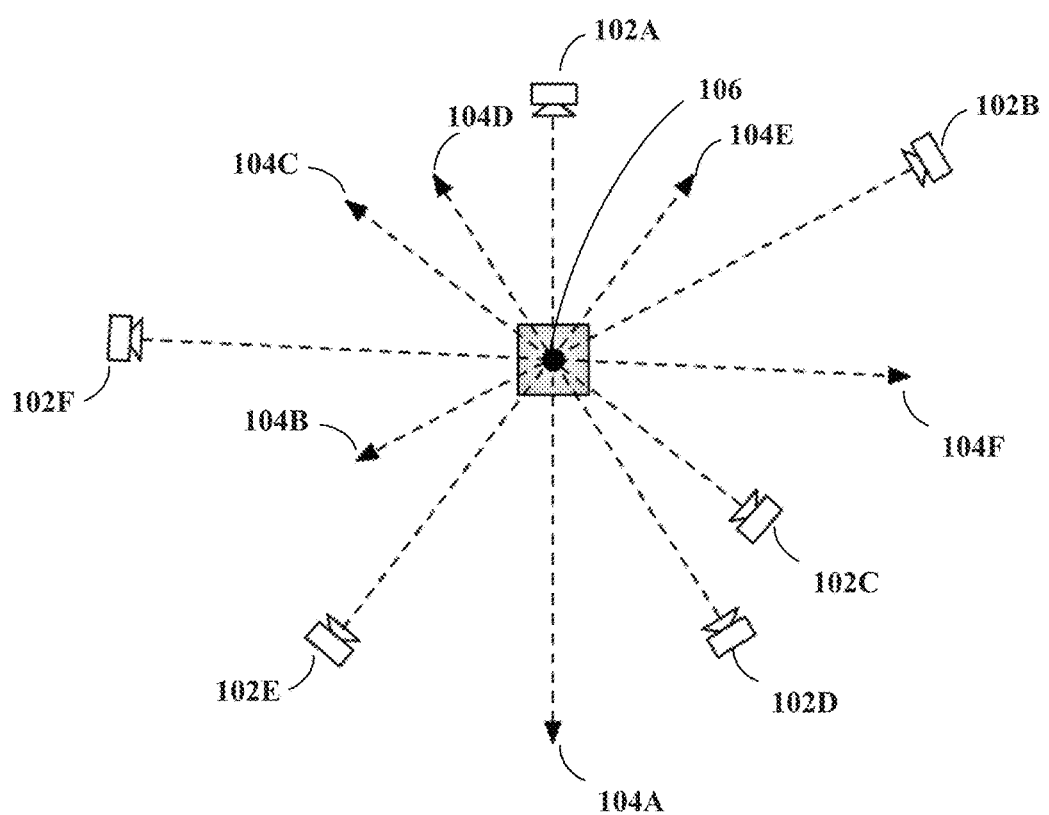

In accordance with one or more embodiments, a geographic location of a POI depicted in a media item may be estimated using the location and orientation information, which information may be supplied by the device(s) that captured the media item. By computing the intersections between the lines of sight from multiple devices taken of the same scene, a reliable location and orientation estimate may be made. FIG. 1 provides an example of an intersection of multiple lines of sight associated with multiple digital media capturing devices in accordance with one or more embodiments. In the example of FIG. 1, devices 102A-102F each capture the media item and geo-positioning information for each of the devices 102A-102F is captured and used in identifying a line of sight, e.g., lines of sight 104A-104F corresponding to devices 102A-102F, respectively. The lines of sight 102A-102F intersect at intersection point 106. Intersection point 106 may be considered to be a location of a point of interest depicted in the media items captured by the devices 102A-102F. The lines of sight 102A-102F shown in FIG. 1 correspond to accurate and precise location and orientation measurements provided by devices 102A-102F; however, not all devices provide accurate and precise measurements which impacts the determination of a location of a POI.

Figure 2:
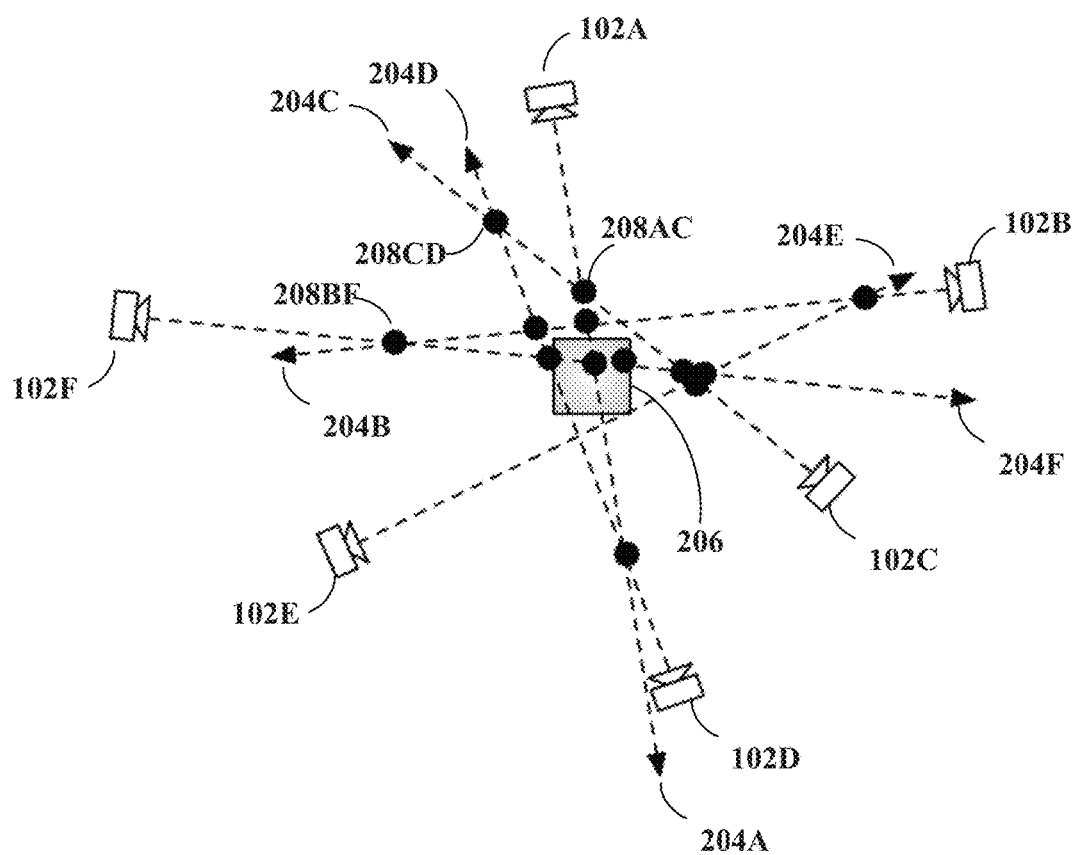

FIG. 2 provides an example of multiple intersection points that may occur where location and orientation measurements provided for multiple digital media capturing devices are imprecise. In the example of FIG. 2, the accuracy of the devices 102A-102F that supply the longitude and latitude coordinates and the compass direction may vary depending on such factors as manufacturing quality, structural interference, atmospheric conditions and signal reception. Consequently, the intersections of the lines of sight 204A-204F of the devices 102A-120F may not necessarily coincide. In the example of FIG. 2, there are multiple intersections, such as intersections 208AC, 208CD and 208BF, which may result from the lack of coincidence of the lines of sight 204A-204F. In the example shown in FIG. 2, POI 206 is exemplified by the shaded square, such that the location of the POI 206 is assumed to be in the center of the square and the spatial footprint of the POI corresponds to the size of the square. In some cases, a POI may not necessarily be located in the center of the media item. That is, a line of sight typically points where the device points, and the device may not be pointing directly at the point(s) of interest captured by the device; consequently, the point(s) of interest may not be located along the line of sight of the device.

Increasingly, mobile phones are being used as cameras. Mobile phones have been shown to provide inaccurate positioning information. Even when outfitted with GPS, it is not clear whether the time which a photo is taken by mobile phone is sufficient to obtain reliable GPS signal, and hence a reliable location estimate. There may be inaccuracies in compass orientation information provided by digital media capturing devices, including mobile phones, in addition to positioning inaccuracies.

In accordance with one or more embodiments, longitude and latitude measurement error(s) may be approximated, or modeled, using a probability, or statistical, distribution, such as and without limitation a bivariate Weibull, Rayleigh, Gamma or Gaussian distribution.

When a sufficient number of photographs have been taken of the same POI, the displacements of the POIs in an individual photo from the center of the image may effectively be canceled out, such that particular measures to address displacements need not be taken into account. Embodiments of the present disclosure may take the displacement(s) of POI(s) into account by, for example, using visual matching, which is discussed in more detail below.

Embodiments of the present disclosure are described herein with reference to photos, or photographs; however it should be apparent that embodiments of the present disclosure are applicable to any type of media item, including any media item produced by any type of digital media capturing device now known or later developed.

For purposes of discussion herein, a collection of photos may be referred to as P, where each photo of the collection may be referred to as p∈P, and may be represented by a tuple $(u_p, \theta_p)$, where $u_p$ may be the capture location of the photo, which capture location may be expressed as $u_p=(\lambda_p, \varphi_p)$ with longitude $\lambda_p$ and latitude, $\varphi_p$, and $\theta_p$ may be the capture orientation of the photo which may be measured anti-clockwise from true north. The tuple may be included in capture information for a device used to capture a photo. Additionally, the geographic distance between any two locations $u_a$ and $u_b$ may be referred to as $\delta(u_a, u_b)$ and may be measured in metric units.

Thus, any point $u_w$ in the world may be expressed relative to a capture location $u_p$ of a photo in terms of its geographic distance $\delta(u_w, u_p)$ and in terms of the orientation angle, which may be expressed as an angle, $\alpha(u_w, u_p, \theta_p)$, which is an angle that is relative to the capture orientation of the line spanned between the capture location and the point in the world, and may be expressed as:

$$\alpha(u_w, u_p, \theta_p) = 180° - 2\beta, \text{ where} \qquad \text{Expr. (1)}$$

$$\beta = \arccos\left(\frac{\delta(u_w, u_o)}{2\delta(u_w, u_p)}\right). \qquad \text{Expr. (2)}$$

In expression (2), a point, $u_o$ represents a position along a capture device's line of sight such that a distance, also referred to as a first distance, between a point in the world, $u_w$, and a capture location, $u_p$, which first distance may be expressed as $\delta(u_w, u_p)$, is equal to a distance, also referred to as a second distance, between the capture location and the position along the capture device's line of sight, which second distance may be expressed as $\delta(u_o, u_p)$, and such equality between the first and second distances may expressed as $\delta(u_w, u_p)=\delta(u_o, u_p)$. The line of sight point $u_o$ may be expressed in terms of its longitude $\lambda_o$ and latitude, $\varphi_o$, as follows:

$$u_o=(\lambda_o,\varphi_o)$$

$$\lambda_o=\lambda_p-\delta(u_w,u_p)\sin\theta_p$$

$$\varphi_o=\varphi_p+\delta(u_w,u_p)\cos\theta_p \qquad \text{Expr. (3)}$$

Thus, in accordance with one or more embodiments, a point along the line of sight, which point may be expressed as $u_o=(\lambda_o, \varphi_o)$, may be selected such that the distance between the capture and world points and the distance between the capture and line of sight points are equal, or $\delta(u_w, u_p)=\delta(u_o, u_p)$. An isosceles triangle may be formed using $u_p$, $u_w$ and $u_o$ where two of the triangle's angles are equal to $\beta$, where $\beta$ may be determined using expression (2), and the third angle is equal to $\alpha$, where $\alpha$ may be determined using expression (1).

Figure 3:
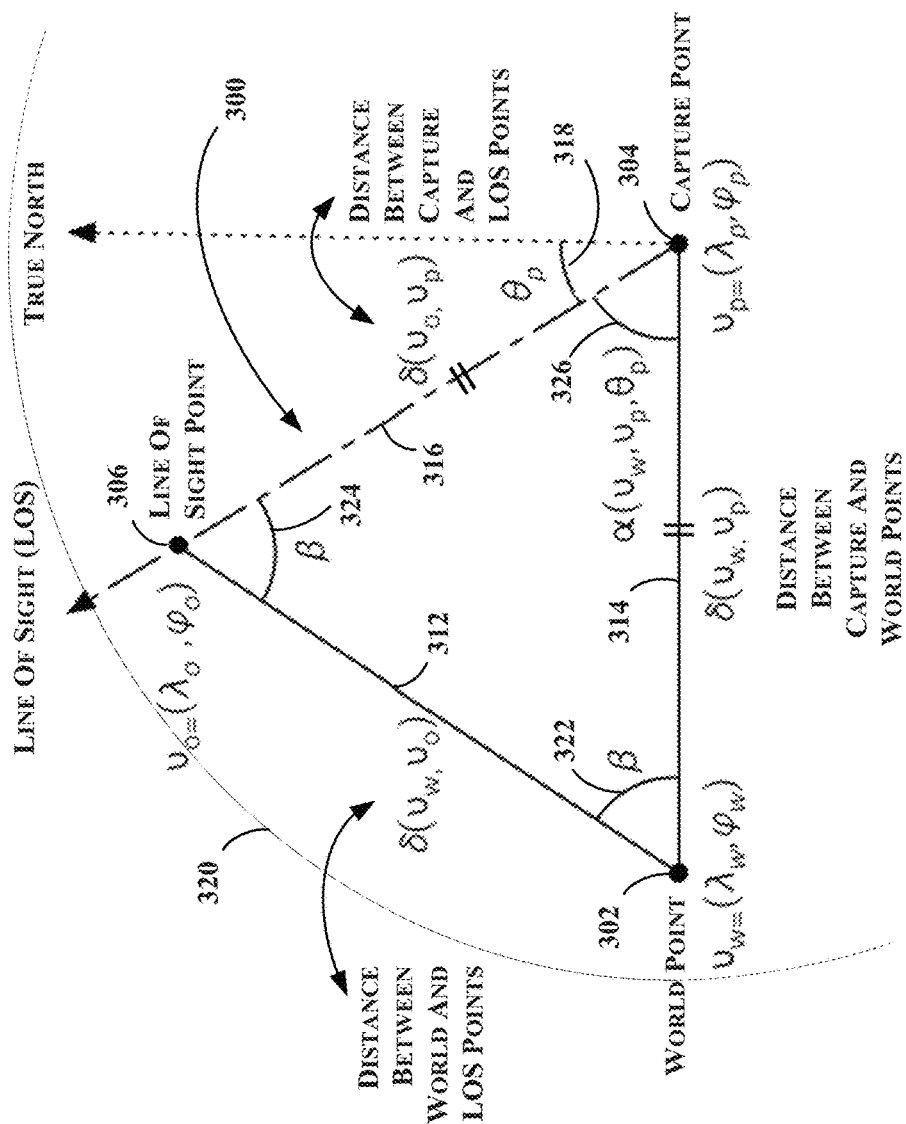

FIG. 3 provides an example of an isosceles triangle formed in accordance with one or more embodiments. In the example of FIG. 3, triangle 300 is an isosceles triangle formed from world, capture and line of sight points 302, 304 and 306 (respectively), which form the vertices of triangle 300, and sides 312, 314 and 316 are formed between the vertices. The line of sight point 306, or $u_o$, is selected such that sides 314 and 316 are equal in geographic distance, e.g., the geographic distances represented by the sides 314 and 316 are equal, and angles 322 and 324 are equal to $\beta$, which may be determined using expression (2). Given a selected world point, $u_w=(\lambda_w, \varphi_w)$, a capture point, $u_p=(\lambda_p, \varphi_p)$, and a capture orientation, $\theta_p$, which is preferably measured anti-clockwise from true north, a geographic distance, $\delta(u_o, u_p)$, or second distance, and the orientation angle, $\alpha(u_w, u_p, \theta_p)$, may be determined. In accordance with one or more embodiments, the orientation angle $\alpha(u_w, u_p, \theta_p)$ may be determined using expression (1). Notably, when a line of sight point is selected that is the same as the selected world point, no triangle is formed, but expression (1) may be used and yields a value of zero for the third angle, or $\alpha=0$.

In accordance with one or more embodiments, a selected world point $u_w$ may be any point in the world. Alternatively, a selected world point $u_w$ may be within a certain distance of the capture point $u_p$. In the example shown in FIG. 3, a geographic area is defined by a circle that has its center at the capture point $u_p$ and the world point $u_w$ is within the circle. A portion 320 of the circle indicating a geographic area is shown in FIG. 3.

It should be apparent that an area other than a circular area may be used to define a geographic area from which a world point is selected. The area may have a non-uniform shape. The area that is used may take into account the curvature of the earth and other elements such as buildings and hills, which may cause points of interest to be out of sight from a given capture point. Points of interest may often be located in densely populated areas with many other surrounding buildings blocking views from far away. In accordance with one or more embodiments, it might be assumed that each photo p∈P of the collection of photos P was taken within a certain distance, such as and without limitation 2.5 km, of a point of interest captured by the photo. It should be apparent that any distance may be used. By way of a non-limiting example, the tallest building in the world, currently the Burj Kalifa in Dubai at 829.8 m, can be seen from about 100 km away on a clear day.

As discussed herein, POIs are, on average, positioned roughly in the center of the photographs of the POIs, and therefore is not necessary to explicitly account for the POIs not being depicted in the center of any individual photographs. Furthermore, given a sufficient number of photos taken of the same point of interest, the displacement of a point of interest from the center of the image in each individual photo may effectively be canceled by the displacement(s) introduced by one or more other photos.

Embodiments of the present disclosure take into account inaccuracies in capture location and orientation measurements reported by, or for, the capturing device(s). In accordance with one or more embodiments, such inaccuracies may follow a distribution, such as a Gaussian distribution, with respect to true, or actual, measurements, and the true, or actual, capture location and orientation of the media items may be modeled by smoothing the reported location and orientation measurements with one or more Gaussian distributions. It should be apparent that other distributions, such as and without limitation a Weibull, Rayleigh, Gamma, etc. distribution, may be used in connection with one or more embodiments of the present disclosure.

In accordance with one or more embodiments, the difference between the actual capture location and orientation and the reported location and orientation may be modeled according to a distribution, such as and without limitation a Weibull, Rayleigh, Gamma or Gaussian distribution. In accordance with one or more such embodiments, each location in the world may be weighted by the likelihood that it could have been seen by a capturing device. By doing this for all media items and superimposing derived likelihoods, a density map may be acquired where each local maximum surpassing some threshold can be considered a POI, and the more popular POIs may have more support relative to the lesser POIs.

In accordance with one or more embodiments, orientation accuracy may be modeled using a one-dimensional Gaussian distribution with standard deviation $\sigma_\theta$ and centered on $\theta_p$, where $\sigma_\theta$ may represent a factor that determines how quickly an influence drops. The Gaussian distribution model that may be used to address orientation inaccuracy may be expressed as:

$$G_{\theta_p}(u_w; u_p, \theta_p, \sigma_\theta) = \frac{1}{\sqrt{2\pi}\,\sigma_\theta} e^{-\frac{\alpha(u_w,u_p,\theta_p)^2}{2\sigma_\theta^2}} \qquad \text{Expr. (4)}$$

In accordance with one or more embodiments, expression (4) may be used to address orientation inaccuracy, e.g., orientation inaccuracy due to inaccurate readings provided by a capture device, or devices. Expression (4) yields a weighted capture orientation, $G_{\theta_p}$, and applies a weight to an orientation associated with a world location, as a possible actual location of a point of interest captured by a device associated with a reported capture point, depending on how the location is oriented with respect to the capture orientation, with larger weights applied to the location(s) closer to the line of sight as compared to the location(s) that are farther away from the line of sight. In accordance with one or more embodiments, the standard deviation $\sigma_\theta$ may be empirically determined and may reflect the variations in orientations, e.g., reported capture orientations. The standard deviation $\sigma_\theta$ may be impacted by such factors as measurement accuracy of manufacture's, or manufacturers', device(s), location in the world, etc.

In accordance with one or more embodiments, the numerator of the exponent in expression (4) is the square of the orientation angle $\alpha(u_w, u_p, \theta_p)$, which angle may be determined in accordance with expressions (1)-(3) and is the angle having the capture point as the vertex between the two equal sides of an isosceles triangle, e.g., the sides formed between the capture point $u_p=(\lambda_p, \varphi_p)$ and a world point $u_w=(\lambda_w, \varphi_w)$ the capture point and a line of sight point $u_o=(\lambda_o, \lambda_\varphi)$ such that $\delta(u_w, u_p)=\delta(u_o, u_p)$. The orientation angle $\alpha(u_w, u_p, \theta_p)$ may be considered to be a difference between the capture orientation and a world point orientation. By way of a non-limiting example, assuming for the sake of the example that 60% of photos are within 5° of a mean capture orientation, using expression (4), a smaller value for angle $\alpha(u_w, u_p, \theta_p)$ may result in a greater weight being applied; conversely, a larger angle $\alpha(u_w, u_p, \theta_p)$ may result in a lesser weight being applied. By way of a further non-limiting example, in expression (4), $\sigma_\theta$ may have a stronger impact, or larger weight, for smaller values of angle $\alpha(u_w, u_p, \theta_p)$, where the difference in the angles of orientation associated with the world and capture points is smaller, relative to a large angle $\alpha(u_w, u_p, \theta_p)$, where the difference in the angles of orientation associated with the world and capture points is larger.

Figure 4:
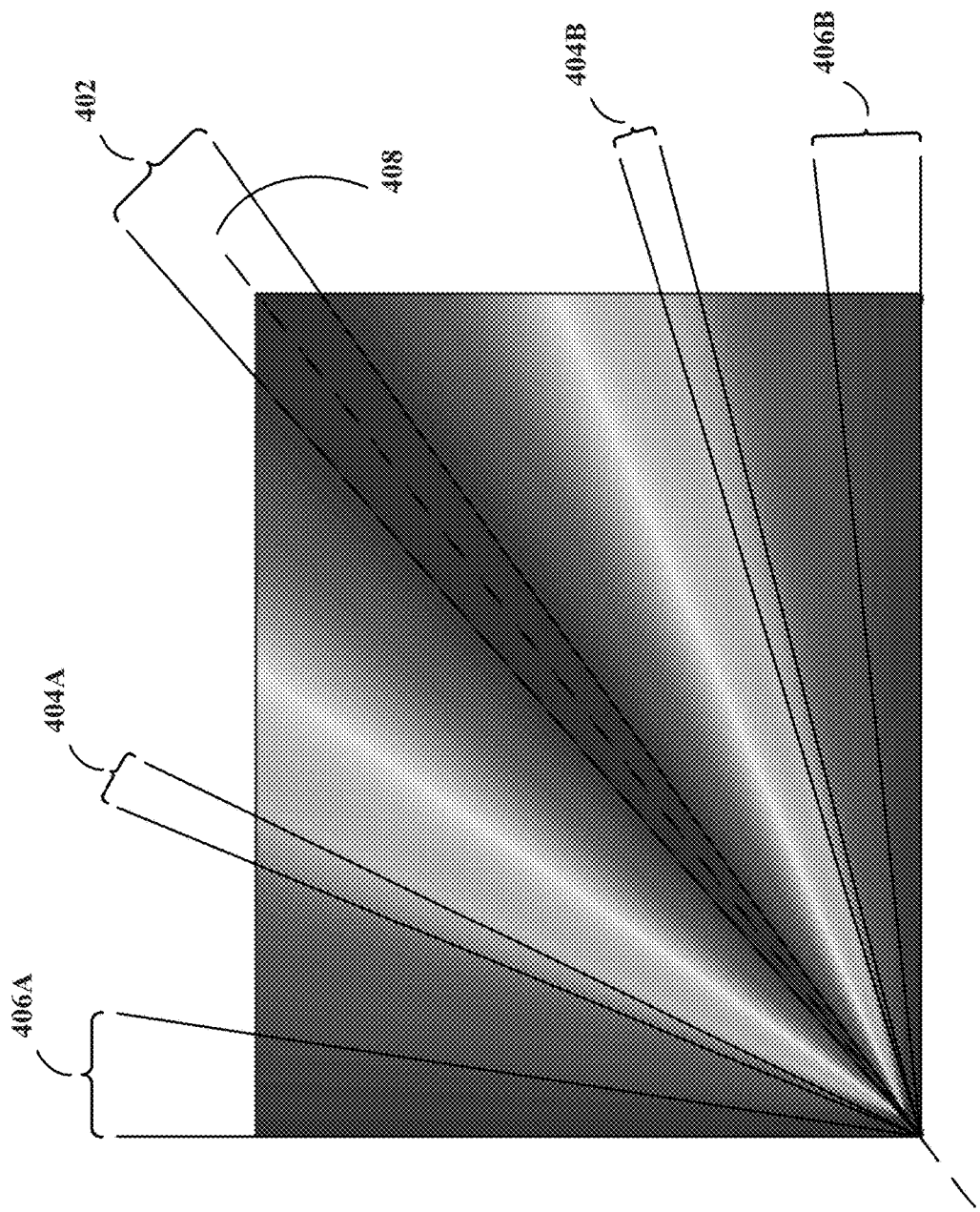
FIG. 4 illustrates capture orientation modeling in accordance with one or more embodiments of the present disclosure.

FIG. 4 illustrates capture orientation modeling in accordance with one or more embodiments of the present disclosure. In the example of FIG. 4, dashed line 408 represents a line of sight, e.g., a line of sight associated with a reported capture location and orientation, at which an applied weight may be the highest, e.g., 0.6%, such that the greatest weighting may be applied to a location with an orientation along the line of sight. Locations having an orientation falling within cone 402 but having a different orientation than the line of sight and orientation 408 may have a weighting that is less than the line of sight 408 weighting. By way of some further non-limiting examples, the weighting(s) associated with locations having an orientation falling within cones 404A and 404B may have a weighting, e.g., 0.1%, which is less than the weighting(s) applied to locations having orientations within cone 402, and the weighting(s) associated with locations with an orientation falling within cones 406A and 406B may be less than the weighting(s) applied to locations having orientations within cones 402, 404A and 404B.

In the example of FIG. 4, the cone 402 may vary for different manufacturers and/or accuracies. The more likely that the reported orientation is accurate, or alternatively stated the more accurate the device, the narrower cone 402, for example. Conversely and by way of a further non-limiting example, the less likely the reported orientation is accurate, or alternatively stated the less accurate the device, the broader cone 402. By way of yet a further non-limiting example, cone 402 is narrower for a more accurate device relative to cone 402 for a less accurate device.

In accordance with one or more embodiments, location inaccuracies may be addressed using a two-dimensional distribution, e.g., Gaussian distribution. Of course, it should be apparent that other distributions, such as a Gamma, Rayleigh, Weibull, etc. distribution, may be used in connection with one or more embodiments of the present disclosure. In accordance with one or more embodiments, the two-dimensional distribution has a standard deviation $\sigma_u$, and is centered on $u_p$. In accordance with one or more such embodiments, the model may be expressed as:

$$G_{u_p}(u_w; u_p; \sigma_u) = \frac{1}{2\pi\sigma_u^2} e^{-\frac{\delta(u_w, u_p)^2}{2\sigma_u^2}} \qquad \text{Expr. (5)}$$

In expression (5), a weight is applied to each possible location, e.g., each world location, for a point of interest depicted in a media item based on how far away the location is from the capture location, such that larger weights may be applied for locations closer to the capture location than weights that may be applied for those locations farther away from the capture location. In accordance with one or more embodiments, the standard deviation $\sigma_u$ may be empirically determined and may reflect the variations in locations, e.g., reported capture locations. The standard deviation $\sigma_u$ may be impacted by such factors as measurement accuracy of manufacture's, or manufacturers', device(s), location in the world, etc. In accordance with one or more embodiments, the numerator of the exponent in expression (5) is the square of the distanced $\delta(u_w, u_p)$, which distance is a distance between capture and world point. By way of a non-limiting example, using expression (5), a smaller value for distance $\delta(u_w, u_p)$ may result in a greater weight being applied; conversely, a larger distance $\delta(u_w, u_p)$ may result in a lesser weight being applied. By way of a further non-limiting example, in expression (5), $\sigma_\theta$ will have a stronger impact, or larger weight, for smaller distances $\delta(u_w, u_p)$, where the distance between the world and capture points is smaller, relative to a large distance $\delta(u_w, u_p)$, where the distance between the world and capture points is larger.

Figure 5:
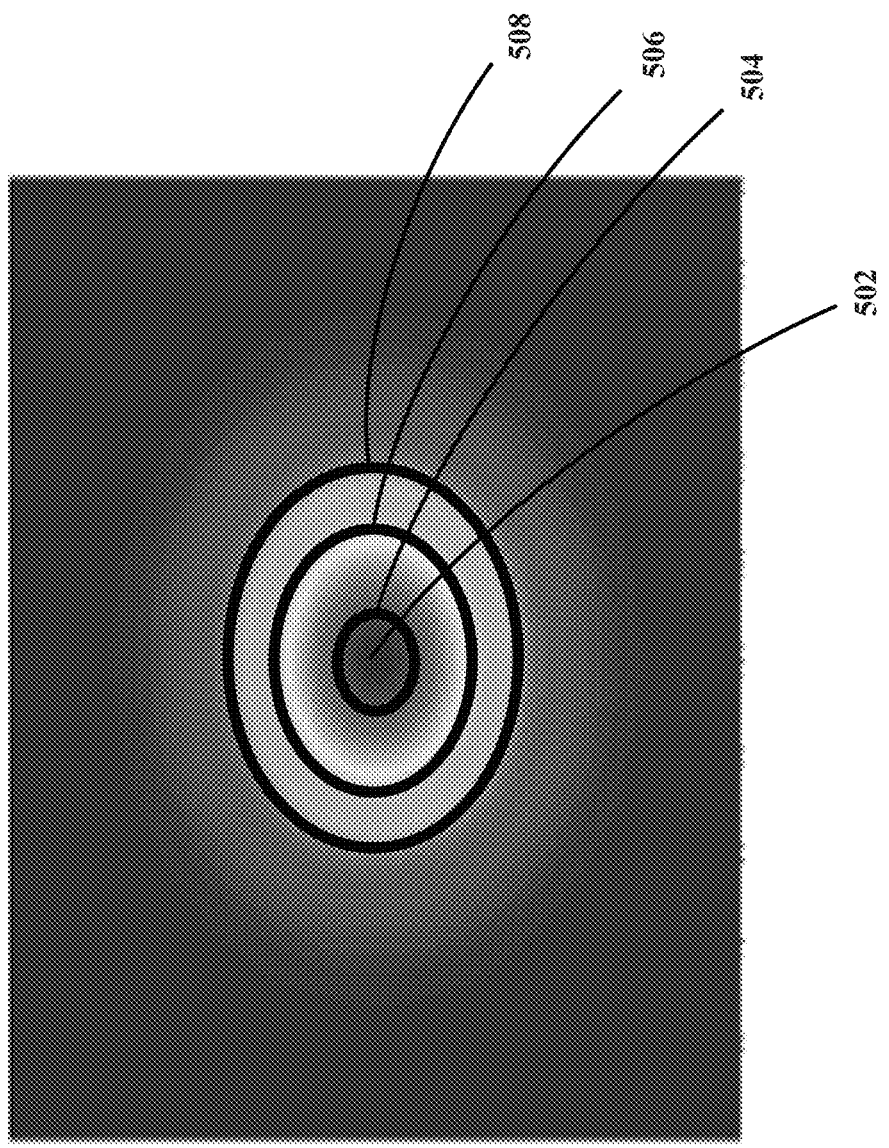
FIG. 5 illustrates capture location modeling in accordance with one or more embodiments of the present disclosure.

FIG. 5 illustrates capture location modeling in accordance with one or more embodiments of the present disclosure. In the example of FIG. 5, a center 502, which may be a center point, may correspond to the mean capture location at which an applied weight is the highest, such that the greatest, or highest, weighting is applied to that location. Locations other than the mean capture location corresponding to center 502 but within area 504 may have a weighting that is less than the weighting associated with center 502. By way of some further non-limiting examples, the weighting(s) associated with locations within area 506 may be less than the weighting(s) applied to locations within area 504, and the weighting(s) associated with locations within area 508 may be less than the weighting(s) applied to locations within areas 502, 504 and 506.

In the example of FIG. 5, the areas may vary for different manufacturers and/or accuracies. The more likely that the reported capture location is accurate, or alternatively stated the more accurate the device, the smaller area 504, for example. Conversely and by way of a further non-limiting example, the less likely the reported capture location is accurate, or alternatively stated the less accurate the device, the broader area 504. By way of a yet a further non-limiting example, area 504 may be narrower for a more accurate device relative to area 504 for a less accurate device.

In accordance with one or more embodiments, weightings, or weights, $G_P$ for a particular photo $p \in P$ may be obtained by convolving the orientation inaccuracy weights with the location inaccuracy weights, which may be represented as:

$$G_P = G_{\theta_p} * G_{u_p} \qquad \text{Expr. (6)}$$

By virtue of expression (6), each location in the world may be influenced by both capture location and orientation inaccuracies. In accordance with one or more embodiments, for each world location considered, the capture orientation inaccuracy weight $G_{\theta_p}$ associated with a photo $p \in P$ may be combined with the location inaccuracy weight $G_{u_p}$ by multiplying the weight to generate the convolved weight $G_p$ for the photo. FIG. 6 provides an example of a modeling of the convolved weights in accordance with one or more embodiments of the present disclosure. In the example of FIG. 6, the capture orientation modeling of FIG. 4 is modified by the location modeling of FIG. 5. In the example, the orientation is fixed to show the influence of location inaccuracies on the orientation. Additionally and in the example, the greatest convolved weight $G_P$ is found within area 608, e.g., the area bounded by the smallest cone-shape. A convolved weight $G_p$ outside area 608 but within area 610 may be less than those weight(s) found in area 608, and the convolved weight $G_P$ outside area 610 but within area 612 may be less than those weight(s) associated with areas 610 and 608.

As a result of the location inaccuracies being convolved with the orientation inaccuracies, locations that are really close to the capture location may actually receive lower weights relative to other locations farther away from the capture location. Such a result may occur due to the location inaccuracies also considering the area behind a capture location when convolving world points close to the capture location, which due to their large orientation angle, $\theta_p$, have practically zero weight; thus after convolution points near the capture location may have a lower weight than expected. In the example of FIG. 6, area 612, which represents location(s) closer to the capture point than locations represented by areas 608 and 610, has lower weights than areas 610 and 608. By way of a non-limiting example, a weighting scheme that associates a lower weight with locations closer to the capture location may negatively impact such locations, and world locations of POIs may actually receive low scores; such a result is logical when considering that the person, or persons, may actually have been standing some distance in any direction from the position supplied by the GPS, for instance, and as such the weights close to the capture location may reflect this.

In accordance with one or more embodiments, weights for each photo p∈P in collection P may be aggregated, or combined to obtain aggregate, final weights $\mathbf{G}_p$. In accordance with one or more such embodiments, for each world location, the weights may be combined by summing the convolved weight $G_P$ of each photo p∈P in collection P for the given world location, which may be expressed as:

$$\mathbf{G}_P = \sum_{p \in P} G_p \qquad \text{Expr. (7)}$$

In so doing, in accordance with one or more embodiments, the world may be modeled as a density map, where the weight associated with each location in the world may reflect the likelihood of a point of interest being situated at that location. By way of a non-limiting example, assuming that each photo p∈P of one or more collections P has an associated set of weights $G_P$ modeling each location in the world, the aggregate final weights $\mathbf{G}_p$ across all of the photos and world locations may be used to model the world as a density map, where the weight associated with each location in the world reflects the likelihood of a point of interest being situated at that location. FIG. 7 provides an example of a density mapping formed from aggregated convolved weights associated with a number of photos in accordance with one or more embodiments of the present disclosure. In the example of FIG. 7, the density mapping may be used to determine a likelihood of a point of interest being present at a given location. By way of a non-limiting example, each point in the mapping may correspond to a given world location, and each point has an associated probability, or likelihood. Point 702 has the best associated probability, or likelihood, of a point of interest being present at the world location corresponding to point 702. By way of a further non-limiting example, each of points 704, 706 and 708 are associated with a lesser confidence than point 702 that a point of interest is located at the corresponding world location.

By way of a non-limiting example, multiple local maxima may exist such as and without limitation when processing photos known to depict a particular POI, when a single photo is processed, when the lines of sight of all photos do not intersect, when the lines of sight intersect in multiple locations, etc. In accordance with one or more embodiments, if multiple local maxima exist, various approaches may be used. By way of a non-limiting example, a POI location may be estimated by, for example, taking the average location of a collection of world points that share the same maximum. By way of a further non-limiting example, a POI location may be estimated by taking the average of the collection of world points with each world point in the collection being weighted by its underlying density. By way of a further non-limiting example, an estimate of a POI location may be determined by applying a filtering operation that uses a threshold value such that weights that fall below the threshold value are set to zero and/or such that weights that are above the threshold value are set equal to one. By setting weights that fall below a threshold value to zero, any influence of such low-weighted locations may be removed. By setting weights that are above the threshold value to one, each of the high-scoring locations may be considered the same as the other high-scoring locations and these locations may be modeled equally rather than giving one or more of the high-scoring locations more priority than others of the high-scoring locations.

In accordance with one or more embodiments of the present disclosure, application of one of the orientation inaccuracy weighting and location inaccuracy weighting may be optional, and such option might be exercised at convolution. In a case that location inaccuracy weighting is optional so that the location inaccuracy weighting is not to be applied, convolution uses the orientation inaccuracy weight without combining it with the location inaccuracy weight. In a case that orientation inaccuracy weighting is optional so that the orientation inaccuracy weighting is not to be applied, convolution uses the location inaccuracy weight without combining it with the orientation inaccuracy weight. By way of a non-limiting example, combined weights may be determined through convolution using a "flat kernel" that applies a weight of "1" at a given orientation or location and "0" anywhere else. To further illustrate without limitation, the "flat kernel" may be a one-dimensional kernel for orientation inaccuracy weighting and a two-dimensional kernel for location inaccuracy weighting. By way of a non-limiting example, a given orientation might be along the line of sight identified by the capture orientation, and a given location may be the capture location. By way of a further non-limiting example, all points along the line of sight may be given a score of "1" and any points that are not along the line of sight may be given a weight of "0". It is possible to use an orientation range or a location range. By way of a non-limiting example, an orientation range may be used such that additional points, e.g., points in addition to the points along the line of sight, may be considered; e.g., points along the line of sight and points within a given range of the line of sight are given a score of "1" and any other points are given a score of "0.". To illustrate further without limitation, the additional points might be points that are within 5 degrees, plus or minus, of the capture orientation. Making one of the weights, i.e., either the orientation or the location weight, optional may therefore result in output from convolution being the value of the non-optional weight, e.g., the non-optional weight is not modified by the optional weight. The score that is assigned to an inaccuracy weight may be used to determine whether or not the inaccuracy weight is applied, e.g., applied where the score is "1" and not applied where the score is "0."

Kernel, distribution and/or model may be used herein interchangeably. FIG. 11 provides examples of flat and Gaussian kernels in accordance with one or more embodiments of the present disclosure. A kernel, model or distribution may include, but is not limited to a flat kernel, such as that depicted by kernel 1102, a Gaussian kernel, such as that depicted by kernel 1104, etc. Other examples of a kernel, model or distribution include without limitation Weibull, Rayleigh, Gamma, etc.

In accordance with one or more embodiments, photos that are known to be taken of a specific point of interest, or points of interest, may be processed, and a given world location with the highest or greatest weight, which indicates the greatest likelihood or confidence, may be selected as an optimal estimate of a world location of a point of interest. By way of a non-limiting example, each photo might be selected based on metadata associated with the photo. Embodiments of the present disclosure may process any photos regardless of what is depicted in the photos. By way of a non-limiting example and in such a case, a density map may be inspected for local maximum, e.g. using mean-shift clustering, where each maxima may represent the point of interest.

Geographic, or world, locations may be represented as a bounded function of continuous longitude and latitude values; however, such locations are typically expressed in a discrete domain. Thus, in accordance with one or more embodiments, a two-dimensional histogram may be used to represent point of interest likelihoods, where the two dimensions may represent longitude and latitude.

In accordance with one or more embodiments, geo-referenced and oriented media items captured close to each other may be accumulated, and by tracing the line of sight originating from each capturing device's location along its orientation, a most likely geographic position for one or more points of interest depicted by the media items may be inferred. Due to measurement inaccuracies associated with both geo-location and geo-orientation, one or more such embodiments of the present disclosure take such inaccuracies into account while estimating a point of interest's location. More specifically, the difference between the actual capture location and orientation and a reported location and orientation can be modeled according to one or more distributions (e.g. Weibull, Rayleigh, Gamma, Gaussian, etc. distribution), which distribution(s) may be used to assign one or more weights to each location in the world where such weight(s) may be considered to be the likelihood that the point of interest could have been seen by the capturing device. Doing this for all media items and superimposing the derived likelihoods, a density map may be acquired where each local maximum, which local maximum might be determined as satisfying a threshold maximum, might be can be considered a location of a point of interest. By way of a non-limiting example, a more popular point of interest might have more support than a lesser point of interest.

In accordance with one or more embodiments, each location, or point, in the world receives an orientation inaccuracy weight for a media item, after which one or more location inaccuracy weight(s) may be identified for the world location in connection with a given media item. In accordance with one or more such embodiments, a one-dimensional kernel may be used to determine each orientation inaccuracy weight, and a two-dimensional kernel may be used to determine the location inaccuracy weight(s). As discussed herein, either kernel may be a flat kernel or alternatively a statistical distribution, such statistical distribution may be without limitation a Gaussian, or other, statistical distribution.

In accordance with one or more embodiments, while the two-dimensional kernel used in location inaccuracy weighting may be of infinite size, practically speaking, weights are likely to be more meaningful near the middle or center of the kernel where the weights are the highest.

Assume for the sake of example and without limitation that the kernel is a Gaussian distribution, the weighting is highest at the center and drops off quickly moving away from the center. In a practical sense, the two-dimensional kernel used for the location inaccuracy weighting may not need to cover all of the world locations. By way of a further illustration without limitation, where the world might be represented as 6×3 million cells, the two-dimensional kernel used for location inaccuracy weighting might cover 100× 100 cells, or some other subset of the cells representing the entire world.

In accordance with one or more embodiments, conceptually speaking, the two-dimensional kernel may be placed at each world location so that the middle of the kernel corresponds to a given world location and the remainder of the kernel corresponds to the remaining world locations covered by the kernel. To further illustrate without limitation, while the kernel may cover all of the world locations, since the weight decreases and ultimately drops off to zero the further away a world location is from the center of the kernel, a world location that may be covered by the kernel but is a far enough away from the world location at the center of the kernel may have little if any location inaccuracy weighting. At each world location covered by the kernel, an orientation value determined for the world location is multiplied by a location inaccuracy weight identified for the world location using the two-dimensional kernel. By way of a non-limiting example, where a Gaussian distribution is used for the two-dimensional kernel, the world location at the center of the Gaussian distribution has the highest associated location inaccuracy weight, locations directly adjacent to the world location have associated location inaccuracy weights that are somewhat less than the highest weight, and so on such that the location inaccuracy weights of "neighboring" world locations decrease, and ultimately reach zero, as the distance from the world location at the center of the kernel increases. For each world location covered by the two-dimensional kernel, its orientation inaccuracy weight may be combined, or convolved, with the world location's location inaccuracy weight determined using the two-dimensional kernel. To further illustrate without limitation, a convolved value for a world location may be determined by multiplying the world location's orientation inaccuracy weight by the location inaccuracy weight determined for the world location using the two-dimensional location inaccuracy kernel, and where the world location is far enough away from the world location at the center of the two-dimensional kernel, the location inaccuracy weight determined for the world location as a neighboring location may be zero and the resulting convolved value may be zero.

In accordance with one or more embodiments, for each media item, each world location's density value may be determined by summing the convolved values determined for the world location and its neighboring world locations, and the two-dimensional kernel positioned over the world location determines the location inaccuracy weight for the world location at the center of the kernel as well as each of the other world locations covered by the kernel. Where multiple media items are considered, i.e., a media item collection comprises more than one media item, the density value for a given world location may be the aggregate of the density values determined for the given world location for all of the media items in the collection.

FIG. 8, which comprises FIGS. 8A and 8B, provides an example process flow to assign weight(s) to world locations in accordance with one or more embodiments of the present disclosure. In accordance with one or more embodiments, in FIG. 8, orientation inaccuracy weights may be computed independently and in parallel, location inaccuracy weights may be applied after each world location's orientation weight(s) is/are computed, and orientation and location inaccuracies may be combined through convolution. In accordance with one or more such embodiments, orientation inaccuracies are computed in a world space, such that each location in the world receives a weight according to an orientation inaccuracy statistical distribution and a world location's orientation inaccuracy weight may be convolved with a location inaccuracy weight determined for the world location using a location inaccuracy statistical distribution.

In the non-limiting example shown in FIG. 8, for each media item in a collection of one or more media items, an orientation inaccuracy weight is determined for each world location, using steps 802, 804, 806, 808 and 810; for each media item in the collection, a capture location inaccuracy weighting statistical distribution may be used to determine location inaccuracy weights for world locations, a world location's location inaccuracy weight may be combined, or convolved, with the world location's orientation inaccuracy weight, using steps 822, 828, 830, 832 and 834; the current world point's convolved, or density, weight may be combined with density weights for "neighboring world points" to generate an aggregate density value (see FIG. 9B); for each media item in the collection, an aggregate density value may be determined for the world location across the media items in the collection, at step 824; and a density map comprising the density values for each of the world locations may be used, at step 826, to estimate one or more POI locations.

More particularly and with reference to FIG. 8A, at step 802, a determination is made whether any media items in the collection of media items being considered remain to be processed. In accordance with one or more embodiments, the collection may comprise media items having associated capture points within a given one or more geographic areas. If not, processing continues at step 822 of FIG. 8B to take into account capture location inaccuracy weights associated with the world points.

If it is determined, at step 802, that media items in the collection remain to be processed, processing continues at step 804 to get the next media item. At step 806, a determination is made whether or not any world points remain to be processed for the current media item. If not processing continues at step 802 to determine whether or not any media items remain to be processed. If it is determined, at step 806, that world points remain to be processed for the current media item, processing continues at step 808 to get the next world point. A capture orientation inaccuracy weight is determined at step 810. Processing continues at step 806 to process any remaining world points for the current media item.

FIG. 9A provides a process flow example for use in determining a capture orientation inaccuracy weight in accordance with one or more embodiments. At step 902, a point along the line of sight of the capture device capturing the media item is determined using the reported capture location and orientation of the capture device.

With reference to FIG. 3, the line of sight may be determined using the reported capture point 304. By way of a non-limiting example, the reported capture orientation, which may be relative to true north, is indicated by angle 318. In accordance with one or more embodiments, a line of sight point may be selected that has the same orientation as the reported capture orientation and in accordance with expression (3). Using expression (3), a point along the line of sight may be selected such that the distance between the capture and line of sight points is the same as the distance between the capture and the current world points. In so doing, an isosceles triangle, e.g. triangle 300 of FIG. 3, is formed.

Referring again to FIG. 9A, the angles of the isosceles triangle formed from the reported capture point, the current world point and the selected line of sight point are determined. With reference to FIG. 3, angles 322 and 324 of triangle 300 may be determined using expression (2) and angle 326 of triangle 300 may be determined using expression (1). Referring again to FIG. 9A, at step 906, where an orientation inaccuracy weight is being determined, a statistical distribution may be used to determine the orientation inaccuracy weight for the current media item given the current world point, capture point, which capture point includes the capture orientation, and an empirically-determined standard deviation. In accordance with one or more embodiments, the statistical distribution is a one-dimensional distribution, such as and without limitation a Gaussian distribution, centered on a mean capture orientation with a standard deviation $\sigma_\theta$, which may be a measure of how much variation exists between reported capture orientations.

Referring again to FIG. 8A, at step 806, processing continues to process any remaining world points for which a capture orientation inaccuracy weight is to be determined. If it is determined, at step 806, that there are no remaining world locations to be processed for the current media item, processing continues at step 802 to process any remaining media items in the collection. If it is determined that orientation inaccuracy weights have been determined for each of the media items in the collection, processing continues at step 822 of FIG. 8B to determine location inaccuracy weights for world points in connection with each media item in the collection, such that for each media item in the collection a location inaccuracy weight is determined for world points.

Referring to FIG. 8B, at step 822, a determination is made whether each of the media items in the collection has been processed, and if so processing continues at step 824. If it is determined, at step 822, that one or more media items remain to be processed, processing continues at step 828 to get the next media item in the collection. At step 830, a determination is made whether any world locations remain to be processed for the current media item. If it is determined, at step 830, that world points remain to be processed, processing continues at step 832 to get the next world point to be processed for the current media item. At step 834, a capture location inaccuracy weight for the current world point is identified using a capture location inaccuracy statistical model centered over the current world point. In accordance with one or more embodiments, the capture location inaccuracy statistical model may be a "flat kernel." The capture location inaccuracy statistical model may be used to identify a capture location inaccuracy weight that may be combined with the capture orientation inaccuracy weight to generate a convolved weight for a world location.

In accordance with one or more embodiments, a statistical distribution may be used to determine a capture location inaccuracy weight for the current media item given the current world point, capture point, which capture point includes the capture orientation, and an empirically-determined standard deviation $\sigma_\mu$. In accordance with one or more embodiments, the statistical distribution may be a two-dimensional distribution, such as and without limitation a Gaussian distribution, centered on the capture point with a standard deviation $\sigma_\mu$. In accordance with one or more embodiments, for a given media item, a convolved weight for a given geographic location, or geographical point, may be determined by combining capture orientation and location inaccuracy weights determined for the given geographic location and media item using expression (6). In accordance with one or more embodiments, an aggregate of the combined capture orientation and location inaccuracies may be determined for a collection of media items in accordance with expression (7).

FIG. 9B provides a process flow example for use in identifying capture location inaccuracy and density weights in accordance with one or more embodiments. Referring to FIG. 9B, at step 910, a location inaccuracy statistical distribution, or model, is centered over the current world point. At step 912, a determination is made whether any world points covered by the distribution remain to be processed. If not, the process flow of FIG. 9B ends. If it is determined, at step 912, that one or more world points remain to be processed, processing continues at step 914 to get the next world point covered by the location inaccuracy statistical distribution. By way of a non-limiting example, the covered world point might be the current world point over which the statistical distribution is positioned or another world point covered by the statistical distribution centered on the current world point. At step 916, the covered world point's location inaccuracy weight identified using the statistical distribution is combined with the covered world point's orientation inaccuracy to generate a convolved value for the covered world point.

At step 918, a density weight is determined for the current world point over which the statistical distribution is centered by aggregating the convolved values determined for each of the world points covered by the statistical distribution centered over the current world point. Processing continues at step 912 to process any remaining world points covered by the distribution that is centered over the current world point.

In accordance with one or more embodiments, a density value is determined for each world point in connection with each media item in the collection, and all of the density values determined for a world point may be aggregated to generate an aggregate density value for the world point across all of media items in the collection. A density map may be formed comprising the aggregate density values of all of the world points. With reference to FIG. 8B, step 824 may process each of the world locations to generate the aggregate density value for each world location. FIG. 10 provides a density value, or density weight, aggregation process flow in accordance with one or more embodiments of the present disclosure. In accordance with one or more embodiments, the steps of FIG. 10 correspond to step 824 of FIG. 8B.

At step 1002, a determination is made whether any media items in the collection, or plurality, of media items remain to be processed. If not, the process flow of FIG. 10 ends. If one or more media items remain to be processed, processing continues at step 1004, at which a next media item from the remaining media items is identified. At step 1006, a determination is made whether any world locations remain to be processed. If not, processing continues at step 1002 to process any remaining media items. If so, processing continues at step 1008 to identify a next world point and the world point's density weighting, e.g., a combined weighting determined for media item and world point at step 918 of FIG. 9B. At step 1010, the world point's weighting is added to an aggregate weighting across the media items for the world point. In accordance with one or more embodiments, the aggregate weighting for the world point reflects the world point's weightings determined for the collection of media items. In accordance with one or more embodiments, one or more histograms, or density maps, may be formed using the aggregate weightings determined for a world points.

In accordance with one or more embodiments, media items depicting one or more points of interest may be used to derive the location for one or more points of interest. Each world point's aggregate weighting, which may be determined from the media items depicting the one or more points of interest, may be used to determine whether a point of interest is located at the world point. By way of a non-limiting example, a world point having an aggregate weighting that satisfies a threshold weighting may be identified as a location of a point of interest.

In accordance with one or more embodiments, the media items may comprise a collection of media items identified as being in a given geographic area, e.g. a media item's capture point is within the given geographic area. A resulting local maxima in a likelihood density map may be identified using mathematical techniques now known or later developed, where each local maxima, which may be a strong local maximum, might be considered a point of interest. One or more label(s) to associate with each local maxima might be obtained by inspecting a description and/or feature associated with the media items that contributed to the creation of that local maxima. The description/feature might take any form or type, including without limitation textual, audio, video, image, multimedia, etc. In accordance with one or more embodiments, where a location is determined for a point of interest, a geographic map might be used to associate a name from the geographic map as a representative name of the point of interest. By way of a non-limiting example, the location of the point of interest determined using one or more media items capturing the point of interest may be used to locate the point of interest on the geographic map, and the name of the point of interest from the geographic map may be used as the representative name of the point of interest.

In accordance with one or more embodiments, the statistical distributions used as measurement inaccuracy distributions may be any type of statistical distribution. A Gaussian distribution might be advantageous as it provides a simplified representation of the measurement inaccuracy distribution(s), while other statistical distributions, such as Gamma, Weibull or Rayleigh, might provide a more accurate representation of the measurement inaccuracy distributions(s). In accordance with one or more embodiments, the statistical distribution(s) used to represent the measurement inaccuracy distribution(s) might be dynamically identified. By way of a non-limiting example, a statistical distribution may be selected based on a particular one or more locations in the world, and/or based on known GPS/compass accuracies, which may be dependent on the number of satellites that are visible, the strength of the magnetic field of the earth, etc.

In accordance with one or more embodiments, altitude and vertical orientation of a capture device might be used for a more accurate line of sight representation. By way of a non-limiting example, a terrain map or blueprint of the geographic area, e.g., city, etc., might be used to determine how far the line of sight might extend. By way of a further non-limiting example, a line of sight might be stopped if it is determined that the line of sight might be interrupted by a building or other obstacle to the line of sight, and a media item might be excluded from contributing to a determination of a location for a point of interest where it is determined that it would have been impossible for the points of interest to be visible to the capturing device that captured the media item.

Like capture inaccuracy weightings disclosed herein, other weights and constraints may be applied to influence the likelihood of a point of interest being situated at each location in the world. By way of some non-limiting examples, such additional weights and/or constraints may be associated with altitude and inclination measurement(s), world structure, or layout, and focus distance measurement(s).

Altitude and inclination measurements, which may be available in capture metadata, may be used to adjust a media item's density map by increasing or decreasing the likelihood of each world location that is considered. The weighting may be dependent on whether or not a point of interest at a given location is more or less likely to be visible in a scene captured by a device, e.g., a camera.

The structure of the world restricts the visibility of areas that are occluded by elements, such as hills and buildings, or those that lie beyond the curvature of the earth. As a result, under these constraints and given a capture location, orientation, altitude and inclination a media item's density map may be modified to emphasize or deemphasize a given one or more world locations.

A focus distance to the subject of focus in a captured scene may be included in the capture metadata depending on the capturing device used to capture a media item, e.g., a photo. A focus distance associated with the media item may be used to modify the media item's density map by accentuating those locations within focus. Alternatively, the focus distance may be estimated directly from the visual content using one or more techniques, including techniques which may acquire knowledge of the device, the scene and/or information acquired from multiple shots of the same scene with different device settings, or even modifications to the camera lens itself. It should be apparent that embodiments of the present disclosure may use any techniques now known or later developed for estimating focus distance.

As yet another non-limiting example, embodiments of the present disclosure may eliminate a media item, e.g., a photographs, which is focused on a point of interest for which a location is not desired, such as a non-stationary object, or point of interest. By way of a non-limiting example, a media item, such as photograph, may be analyzed to detect whether the media item's point of interest is an object for which it is not beneficial to determine a location, which object may be a non-stationary; and discard the media item from further consideration. By way of a further non-limiting example, a media item may be analyzed to detect a face, or faces, in focus within the visual content of a photo, and discard any photo that is determined to be focused on a person, or persons, rather than on a point, or points, of interest, for which a location is to be determined. By way of a further non-limiting example, a visual matching may be used, e.g., a media item may be visually inspected to identify the point(s) of interest depicted by the media item. The compass location may be adjusted accordingly to no longer represent the line of sight, but rather the direction towards the point(s) of interest. In case more than one point of interest is detected, multiple lines of sight might be used, and each one of the multiple lines of sight might originate from the same capture location.

World Shape

In accordance with one or more embodiments, expressions (4), (5), (6) and (7) may be dependent on a particular shape of the world. In other words, orientation modeling performed using expression (4) and location modeling performed using expression (5) may depend on a particular world shape, and weight convolution performed using expression (6) and weight aggregation performed in accordance with expression (7), both of which are based on orientation and location modeling performed using expressions (4) and (5) may therefore be dependent on a particular world shape.

In accordance with one or more such embodiments, a determination of distance, $\delta(u_p, u_w)$, which notation is interchangeable with the notation $\delta(u_w, u_p)$ also used herein, and an angle, $\alpha(\theta_p, \theta_w)$, which notation is interchangeable with the notation $\alpha(u_w, u_p, \theta_p)$ also used herein, between capture and world points, $u_p$ and $u_w$ (respectively), which is used in connection with expressions (4), (5), (6) and (7) may differ based on a shape used to model the world, or planet, e.g., Earth. By way of some non-limiting examples, the world may be considered, or modeled, as an ellipsoid, a sphere, a plane.

As discussed herein, expression (4) takes into account errors introduced by sensors, e.g., the sensors of a capture device, which provide location and orientation measurements, e.g., a location and an orientation of a capture location, or point, of a captured image, e.g., photograph. Using expression (4), a weight may be applied to each point in the world using its angle with respect to the capture orientation to account for errors which may be introduced by the sensors that provide the orientation measurements. Given the angle, the orientation error may be modeled as a Gaussian distribution, in accordance with expression (4), which may effectively apply a larger weight to points closer to a line of sight than points further away, as is illustrated in FIG. 4.

As is represented by expression (5), an additional weight may be applied to each point so that errors introduced by the sensor(s) providing the capture position measurement may be taken into account. As with orientation error(s), position error(s) may be modeled as a Gaussian, which may effectively apply a weight to points based on how far away the points are from the capture position, with larger weights applied to points closer to the capture position than to those points farther away, as is illustrated in FIG. 5.

In accordance with one or more embodiments and as is represented by expression (6), weights resulting from orientation modeling performed using expression (4) and the weights resulting from position modeling performed using expression (5) may be convolved using expression (6) so that each point in the world may be influenced by both capture orientation and position measurement errors, which is illustrated in FIG. 6. The weights computed at each point for each photograph in a collection, or set, of photographs may be aggregated using expression (7). In accordance with one or more embodiments, the world may be modeled as a density map, where the weight associated with each location, or coordinate, may reflect a likelihood of a POI being positioned at the location, as is illustrated in FIG. 7.

FIG. 12 is illustrative of a capture point and a world point on the surface of the planet, which points may be used in accordance with one or more embodiments of the present disclosure. As discussed above, a photo may be represented by a tuple, $(u_p, \theta_p)$, where $u_p$ may be the capture point, or location, of the photo, which capture point may be expressed as $u_p=(\lambda_p, \varphi_p)$, with longitude, $\lambda_p$, and latitude, $\varphi_p$, and $\theta_p$ may be the capture orientation of the photo, which may be measured clockwise from true north. As is discussed above, capture orientation may be measured anti-clockwise from true north; however, as is discussed below, capture orientation may be measured in a clockwise direction. With respect to the capture position, $u_p$, of a photo, any point, $u_w$, on the surface of the planet may then be expressed in terms of its distance, $\delta(u_p, u_w)$, from the capture point and its angle $\alpha(\theta_p, \theta_w)$, given the capture point's orientation, $\theta_p$. With reference to FIG. 12, the capture point's orientation, $\theta_p$, is represented by arc 1202, a given world point's orientation, $\theta_w$, is represented by an arc 1206, and $\alpha(\theta_p, \theta_w)$ is represented by arc 1204.

In accordance with one or more embodiments, distance $\delta(u_p, u_w)$ and angle $\alpha(\theta_p, \theta_w)$ may be determined where the world, or planet, 1200 is modeled as an ellipsoid, a sphere or as a plane. There are tradeoffs associated with different world shape models. For example and without limitation, an ellipsoid model may produce more accurate values but may be more expensive to compute than the sphere and plane world models, whereas a plane world model may be less accurate but may be fastest to compute, and the sphere model falls somewhere in between the ellipsoid and plane world models with respect to such benchmarks as expense, speed and/or accuracy.

In the following ellipsoid, sphere and plane world shape examples, a difference in the capture and world points' longitudes $\lambda_p$ and $\lambda_w$ (respectively) may be represented as $\Delta\lambda=\lambda_w-\lambda_p$, a difference in the capture and world points' latitudes $\varphi_p$ and $\theta_p$ (respectively) may be represented as $\Delta\varphi=\varphi_w-\varphi_p$, and a difference in the capture and world points' angles, or orientations, $\theta_p$ and $\theta_w$ (respectively), may be represented as $\Delta\theta=\theta_w-\theta_p$.

In accordance with one or more embodiments, and where the world is modeled as an ellipsoid, planet 1200 may be represented as an oblate ellipsoid. The distance $\delta(u_p, u_w)$ of the shortest path over the surface of the Earth between the capture point $u_p$ and the world point $u_w$ may be computed in various ways. By way of one non-limiting example, the distance $\delta(u_p, u_w)$ may be computed as a shortest path between the capture and world points using Vincenty's iterative inverse formula.

FIG. 13 provides an example of an implementation of Vincenty's iterative inverse formula used in accordance with one or more embodiments of the present disclosure. The example implementation may be used to determine a distance between the world and capture points and an initial angle for the world point. In the example of FIG. 13, planet 1200 is considered an ellipsoid, and the first and second points may be capture and world points. The initial angle, or bearing, $\theta_w$, of the world point, $u_w$, is with respect to true north, and is a compass direction from the capture point, $u_p$, to reach the world point, $u_w$, in a straight line along a geodesic. The angle, $\alpha(\theta_p, \theta_w)$, may be obtained as a smallest angular difference between the capture and world orientations, $\theta_p$ and $\theta_w$ (respectively), which may be determined as follows:

$$\alpha(\theta_p, \theta_w) = 180° - ||\Delta\theta| - 180°| \qquad \text{Expr. (8)}$$

When the planet 1200 is considered to be a sphere, spherical trigonometry may be applied to determine $\delta(u_p, u_w)$, which may be considered to be the length of a great-circle arc between the capture and world points, $u_p$ and $u_w$ (respectively). The distance, $\delta(u_p, u_w)$, may be computed by applying the spherical law of cosines to determine a central angle, $\varsigma$, which may be determined using expression (9) or expression (10), as follows:

$$\varsigma = \operatorname{acos}(\sin\varphi_p \sin\varphi_w + \cos\varphi_p \cos\varphi_p \cos\varphi_w \cos(\Delta\lambda)) \qquad \text{Expr. (9)}$$

$$\varsigma = 2\operatorname{asin}\left(\sqrt{h\sin(\Delta\varphi) + \cos\varphi_p \cos\varphi_w h\sin(\Delta\lambda)}\right) \qquad \text{Expr. (10)}$$

Expression (10) might be used where large rounding error(s) may occur, such as in a case that the capture and world points lie close together and the central angle is computing using low floating-point precision, for example.

In expression (10), $h\sin(x) = \sin^2(X/2)$. The length of the great-circle arc $\delta(u_p, u_w)$ between the capture and world points, $u_p$ and $u_w$ (respectively), may be obtained by multiplying the central angle, $\varsigma$, with the mean radius, r, of the Earth, which may be represented as follows:

$$\delta(u_p, u_w) = r\varsigma \qquad \text{Expr. (11)}$$

As with an ellipsoid model, the orientation, $\theta_w$, of the world point, $u_w$, may be determined with respect to true north, which if initially headed into from $u_p$ leads to $u_w$ in a straight line along the great-circle arc. The following expression may be used to determine the orientation, $\theta_w$, of the world point, $u_w$:

$$\theta_w = \begin{cases} \operatorname{atan}\left(\frac{b}{a}\right), & \text{if } a > 0° \text{ and } b \geq 0° \\ \operatorname{atan}\left(\frac{b}{a}\right) + 360°, & \text{if } a > 0° \text{ and } b < 0° \\ \operatorname{atan}\left(\frac{b}{a}\right) + 180°, & \text{if } a > 0° \\ 90°, & \text{if } a = 0° \text{ and } b > 0° \\ 270°, & \text{if } a = 0° \text{ and } b < 0° \\ 0°, & \text{otherwise,} \end{cases} \qquad \text{Expr. (12)}$$

where $\alpha = \cos \varphi_p \sin \varphi_w - \sin \varphi_p \cos \varphi_w \cos(\Delta\lambda)$ and $b = \sin(\Delta\lambda)\cos \varphi_w$. With the obtained $\theta_w$, the angle $\alpha(\theta_p, \theta_w)$ may be determined using Expression (8).

In accordance with one or more embodiments, planet 1200 may be modeled as a plane, e.g., a rectangular plane, where the shortest distance between two points is formed by a straight line and trigonometry may be used to determine the length of the line and an associated angle. The length of the line between capture and world points, $u_p$ and $u_w$ (respectively), may be determined using Pythagoras' Theorem on an equirectangular projection of the points, such as is illustrated in the below example:

$$x = \Delta\lambda\cos\left(\frac{\varphi_p + \varphi_w}{2}\right) \qquad \text{Expr. (13)}$$

-continued $$y = \Delta\varphi$$

$$\delta(u_p, u_w) = r\sqrt{x^2 + y^2},$$

where r is a mean radius of the planet, angle $\theta_w$ may be determined using expression (12), where $a=\Delta\varphi$ and $b=\Delta\lambda$, and the angle $\alpha(\theta_p, \theta_w)$ may be determined using Expression (8).

Three-Dimensional Modeling

In accordance with one or more embodiments discussed above, a two-dimensional approach is used using position and angle information. In accordance one or more alternative embodiments, a three-dimensional approach may be used such that a location of a POI may be estimated in terms of elevation, or vertical location, in addition to capture position and capture orientation information. In accordance with one or more such embodiments, each photo may be represented by a tuple $(u_p, \epsilon_p, \theta_p, \eta_p)$, where $u_p$ is the capture position of the photo, $\theta_p$ is the horizontal capture orientation of the photo, $\epsilon_p$ is an elevation, which is also referred to herein as a vertical location, associated with the photo and $\eta_p$ is a vertical orientation associated with the photo. The elevation, $\epsilon_p$, may be an elevation above or below a surface of the planet, which may be modeled as a particular shape, e.g., an ellipsoid, sphere, plane, etc.

In a case of an ellipsoid, the Earth may be modeled using a reference ellipsoid, e.g., a WSG84 reference ellipsoid, with positive elevations above the surface and negative elevations below the surface. The horizontal orientation, $\theta_p$, is a measure of the horizontal capture orientation of the photo as measured clockwise from true north. The vertical orientation, $\eta_p$, measures the angle between the line of sight and the curvature of the surface of the reference ellipsoid, with positive angle above the curvature and negative angles below the curvature.

By way of a non-limiting example, a vertical orientation of 0° indicates that the camera was held horizontally, a vertical orientation of 90° indicates that the camera was held vertically upwards to the sky, while a vertical orientation of −90° indicates that the camera was held vertically downwards towards the surface.

In accordance with one or more embodiments, to take any differences in the quality or accuracy of the horizontal and vertical measurements into account, e.g. a GPS device may measure elevation more accurately than it may measure longitude and latitude, modeling of the horizontal and vertical position components may be performed separately, and the horizontal and vertical orientation components may be modeled separately and combined.

With respect to the capture position, $u_p$, of a photo, any world point, $u_w$, may be expressed in terms of its horizontal distance, $\delta(u_p, u_w)$, its vertical distance, $v(\epsilon_p, \epsilon_w)$, its horizontal angle, $\alpha(\theta_p, \theta_w)$, and its vertical angle, $\beta(\eta_p, \eta_w)$. In addition to the difference between the capture and world points' longitudes, $\Delta\lambda$, latitudes $\Delta\varphi$ and angles, $\Delta\theta$, differences between the capture and world points' elevations, or verticals, and vertical orientations may be expressed as $\Delta\epsilon=\epsilon_w-\epsilon_p$ and $\Delta\eta=\eta_w-\eta_p$ (respectively).

Expression (5) may be used to model the horizontal position, and the vertical position may be modeled as a one-dimensional Gaussian distribution with standard deviation, $\sigma_\epsilon$. Such a model may be expressed as follows:

$$G_{\epsilon_p} = \frac{1}{\sqrt{2\pi\sigma_\epsilon}} e^{-\frac{v(\epsilon_p,\epsilon_w)^2}{2\sigma_\epsilon^2}} \quad \text{Expr. (14)}$$

The horizontal and vertical position components may be combined by taking their outer product, represented as follows:

$$G_{v_{\epsilon p}} = G_{v_p} \otimes G_{\epsilon_p} \quad \text{Expr. (15)}$$

which produces a three-dimensional space in which each point has a weight that represents a joint influence of the horizontal and vertical components on the position measurement error.

The horizontal orientation component may be modeled as in Expr. (4), and the vertical orientation may be modeled as a one-dimensional Gaussian with standard deviation $\sigma_\eta$, represented as follows:

$$G_{\eta_p} = \frac{1}{\sqrt{2\pi\sigma_\eta}} e^{-\frac{\beta(\eta_p,\eta_w)^2}{2\sigma_\eta^2}} \quad \text{Expr. (16)}$$

Each world point, $u_w$, may be affected by horizontal and vertical orientation measurement errors, and a joint orientation weight at each point may be determined by multiplying its horizontal and vertical weights, which may be represented as follows:

$$G_{\theta_{\eta p}} = G_{\theta_p} G_{\eta_p} \quad \text{Expr. (17)}$$

Locations close to a line of sight may therefore receive high orientation weights, whereas those locations further away from the line of sight in the horizontal dimension and/or the vertical dimension may receive lower orientation weights. Combined weights, $G_p$, for a particular photo, p∈P, may be obtained by convolving the joint orientation error weights with the joint position error weights, as follows:

$$G_p = G_{\theta_{\eta p}} * G_{v_{\epsilon p}}, \quad \text{Expr. (18)}$$

such that each world point, $u_w$, is affected by both the capture orientation and the capture position measurement errors, producing a three-dimensional density map enveloping the entire planet. By aggregating the weights in the density maps of all photos, p∈P, final weights, $G_p$, may be represented by Expr. (7). The location of a POI may be estimated by inspecting the produced aggregate three-dimensional density map for a maximum. By way of a non-limiting example, the visibility of two point in terms of a shortest path that rays of light travel between them may be approximated by considering the shortest geographic path, since light does not travel in straight lines on the planet. The shortest path may be used for calculating horizontal distance, $\delta(u_p, u_w)$, vertical distance, $v(\epsilon_p, \epsilon_w)$, horizontal angle, $\alpha(\theta_p, \theta_w)$, and vertical angle, $\beta(\eta_p, \eta_w)$, as discussed below using examples of the planet modeled as an ellipsoid, a sphere and as a plane.

Considering the world as an ellipsoid, expanding the location measurements with elevation information changes the shortest horizontal distance between two points. By way of a non-limiting example, if the horizontal distance between two points is computed without elevation, using $\Delta\lambda$ and $\Delta\varphi$, the shortest distance between two points along the surface of the reference ellipsoid, then the distance would be underestimated when the points are in actuality above the surface, or overestimated when the two points are below the surface, such as would be the case for locations in a valley below sea level for example.

FIG. 14 provides an example of horizontal distances between two points dependent on elevation, or vertical location, in accordance with one or more embodiments of the present disclosure. The example of FIG. 14, illustrates a distance between two points where the points are located below the surface, on the surface and above the surface. As can be seen in the example of FIG. 14, two points, $a_1$ and $b_1$, which are located below the surface, are separated by a shorter horizontal distance than two points, $a_2$ and $b_2$, which are located on the surface, while two points, $a_3$ and $b_3$, which are located above the surface, are separated by the longest horizontal distance.

Embodiments of the present disclosure approximate the actual horizontal distance by increasing or decreasing the size of a reference ellipsoid such that its surface is located between the two points at their average elevation. This results in the length of half the path between the two points being underestimated and the other half of the path between the two points being overestimated, thereby together yielding a more approximate shortest horizontal distance.

By way of a non-limiting example, given the position and elevation of two points, a capture point and a world point, represented as $(u_p, \epsilon_p)$ and $(u_w, \epsilon_w)$, a semi-major axis, $a'$, of the resized reference ellipsoid may be computed as follows:

$$a' = a + \frac{\epsilon_p + \epsilon_w}{2}\left(1 + f\sin\left(\frac{\varphi_p + \varphi_w}{2}\right)\right), \quad \text{Expr. (19)}$$

where a is the semi-major axis of the reference ellipsoid, e.g., WSG84 reference ellipsoid, and f its flattening. The semi-minor axis, b', may be determined as follows:

$$b' = a'(1-f) \quad \text{Expr. (20)}$$

The capture and world points may be projected onto a modified, e.g., resized, surface of the reference ellipsoid, and Vincenty's iterative inverse formula may be applied, e.g., using the implementation shown in FIG. 13, to determine a geodesic between the points along the resized reference ellipsoid, which produces a distance, $\delta(u_p, u_w)$, and an initial bearing, $\theta_w$, which initial bearing may be used to compute an angle, $\alpha(u_p, u_w)$, using Expr. (8).

While a chord length might be determined between the two projected points on the surface of the resized reference ellipsoid, because refraction makes rays of light concave toward the Earth, the length of the chord might underestimate the actual length of the curved path that rays of light would follow, and chords would thus not necessarily produce more accurate distances than the approach discussed above.

Additionally, the shortest geographic path between two points that follows the curvature of the surface of the planet smoothly increases or decreases in altitude, according to the difference in elevation between the two points, if any. From a vertical perspective, the surface curvature may effectively be ignored, since the difference in elevations between points is independent of the curvature. The planet can therefore be considered flat from the point of view of the vertical distance, $v(\epsilon_p, \epsilon_w)$, and the vertical angle, $\beta(\eta_p, \eta_w)$, such that both may be modeled using standard trigonometric functions. FIG. 15, which comprises FIGS. 15A and 15B, provide examples of determining horizontal and vertical distances and vertical orientation in accordance with one or more embodiments of the present disclosure.

FIG. 15A provides an example of determining horizontal and vertical distances and vertical orientations using a curved earth surface, and FIG. 15B provides an example of determining horizontal and vertical distances and vertical orientations using a flattened earth surface. In FIGS. 15A and 15B, two points, p and w, represented by reference numerals 1502 and 1504 in FIGS. 15A and 15B, may represent the capture and world points, respectively. The points p and w, which are also labeled as points 1502 and 1504, may be represented by $(u_p, \epsilon_p)$ and $(u_w, \epsilon_w)$ (respectively), where u represents a position and $\epsilon$ represents an elevation. Each of the points p and w has a vertical orientation, $\eta_p$ (segment 1516) and $\eta_w$ (segment 1512) (respectively). Additionally, in FIGS. 15A and 15B, $\delta(u_p, u_w)$, which is the horizontal distance between the two points, is represented by solid segment 1508, $v(\epsilon_p, \epsilon_w)$, which is the vertical distance between the two points, is represented by segment 1520; and $\beta(\eta_p, \eta_w)$, which is the vertical angle between the two points, is represented by the arc 1514. Segment 1518 represents the line of sight. In FIG. 15A, dashed segment 1506, solid segment 1508 and dashed segment 1510 represent the curvature of the surface of the Earth, while in FIG. 15B, dashed segment 1506, solid segment 1508 and dashed segment 1510 represent a flattened surface for the Earth. The distances and angles prior to flattening are the same after flattening.

In accordance with one or more embodiments, the vertical distance, 1520, between the two points 1502 and 1504 may be determined by taking their absolute difference in elevation, which may be represented as follows:

$$v(\epsilon_p, \epsilon_w) = |\Delta\epsilon|, \quad \text{Expr. (21)}$$

and the vertical orientation, $\eta_w$, may be determined as follows:

$$\eta_w = \begin{cases} \operatorname{atan}\left(\frac{b}{a}\right), & \text{if } a > 0 \\ 90°, & \text{if } a = 0 \text{ and } b > 0 \\ -90°, & \text{if } a = 0 \text{ and } b < 0 \\ 0°, & \text{otherwise} \end{cases} \quad \text{Expr. (22)}$$

In Expr. (22), $a = \delta(u_p, u_w)$, $b = \Delta\epsilon$, and the distance $\delta(u_p, u_w)$ is a positive value. The vertical angle, $\beta(\eta_p, \eta_w)$, may be determined using the smallest angular difference between $\eta_p$ and $\eta_w$, which may be represented as:

$$\beta(\eta_p, \eta_w) = |\Delta\eta| \quad \text{Expr. (23)}$$

When the world is modeled as a sphere, curvature influence may be ignored with respect to the vertical distance and angle measurements, as in the case of an ellipsoid. Thus, the same steps used in modeling the world as an ellipsoid may also be used in modeling the world as a sphere. The two points 1502 and 1504 may represent the capture and world points, respectively, and may be represented by $(u_p, \epsilon_p)$ and $(u_w, \epsilon_w)$ (respectively), where u represents a position, or location, and $\epsilon$ represents an elevation. Each of the points 1502 and 1504 has a vertical orientation, $\eta$. A radius of a resized sphere may be represented as:

$$r' = r + \frac{\Delta\epsilon}{2}, \quad \text{Expr. (24)}$$

where r is a mean radius of the Earth. A horizontal distance, $\delta(u_p, u_w)$, and horizontal angle, $\alpha(\theta_p, \theta_w)$, may be determined using Expr. (11) and Expr. (8), respectively, as discussed above in connection with an original sphere, with the exception that the resized sphere is used rather than the original sphere. A vertical distance, $v(\epsilon_p, \epsilon_w)$, may be determined according to Expr. (21), and vertical angle, $\beta(\eta_p, \eta_w)$, may be determined according to Expr. (23).

Where the world is modeled as a plane, rather than as an ellipsoid or a sphere, as when the world is considered flat, a horizontal distance between two points 1502 and 1504 of FIG. 15B remains the same across changes in elevation. A horizontal distance, $\delta(u_p, u_w)$, may be determined in accordance with Expr. (13), and a horizontal angle, $\alpha(\theta_p, \theta_w)$, may be determined using Expr. (8), using an angle $\theta_w$ determined using Expr. (12) with $\alpha = \Delta\varphi$ and $b = \Delta\lambda$. A vertical distance, $v(\epsilon_p, \epsilon_w)$, may be determined using Expr. (21) and a vertical angle, $\beta(\eta_p, \eta_w)$, may be determined using Expr. (23).

FIG. 16 illustrates some components that can be used in connection with one or more embodiments of the present disclosure. In accordance with one or more embodiments of the present disclosure, one or more computing devices, e.g., one or more servers, one or more user devices, one or more digital media capture devices, etc., are configured to comprise functionality described herein. For example, a computing device 1602 can be configured to execute program code, instructions, etc. to provide functionality in accordance with one or more embodiments of the present disclosure. The same or another computing device 1602 can be configured to capture one or more media items and/or associated capture points.

Computing device 1602 can serve content to user computing devices 1604 using a browser application via a network 1606. Data store 1608 can be used to store program code to configure a server 1602 to execute functionality in accordance with one or more embodiments of the present disclosure.

The user computing device 1604 can be any computing device, e.g., a computing device capable of capturing media items and/or providing capture point information. Computing device 1604 may include a device such as and without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device may further comprise one or more components for capturing a media item, such as and without limitation a still and/or video image camera, and/or one or more components for determining a capture location, such as and without limitation a GPS component.

A computing device such as server 1602 and the user computing device 1604 can include one or more processors, memory, a removable media reader, network interface, display and interface, and one or more input devices, e.g., keyboard, keypad, mouse, etc. and input device interface, for example. One skilled in the art will recognize that server 1602 and user computing device 1604 may be configured in many different ways and implemented using many different combinations of hardware, software, or firmware.

In accordance with one or more embodiments, a computing device 1602 can make a user interface available to a user computing device 1604 via the network 1606. The user interface made available to the user computing device 1604 can include content items, or identifiers (e.g., URLs) selected for the user interface in accordance with one or more embodiments of the present invention. In accordance with one or more embodiments, computing device 1602 makes a user interface available to a user computing device 1604 by communicating a definition of the user interface to the user computing device 1604 via the network 1606. The user interface definition can be specified using any of a number of languages, including without limitation a markup language such as Hypertext Markup Language, scripts, applets and the like. The user interface definition can be processed by an application executing on the user computing device 1604, such as a browser application, to output the user interface on a display coupled, e.g., a display directly or indirectly connected, to the user computing device 1604.

In an embodiment the network 1606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. In accordance with one or more embodiments, a network may be used to transmit one or more media items and/or capture points.

A network may include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols.

Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 16. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

FIG. 17 is a detailed block diagram illustrating an internal architecture of a computing device, e.g., a computing device such as server 1602 or user computing device 1604, in accordance with one or more embodiments of the present disclosure. As shown in FIG. 17, internal architecture 1700 includes one or more processing units, processors, or processing cores, (also referred to herein as CPUs) 1712, which interface with at least one computer bus 1702. Also interfacing with computer bus 1702 are computer-readable medium, or media, 1706, network interface 1714, memory 1704, e.g., random access memory (RAM), run-time transient memory, read only memory (ROM), etc., media disk drive interface 1720 as an interface for a drive that can read and/or write to media including removable media such as floppy, CD-ROM, DVD, etc. media, display interface 1710 as interface for a monitor or other display device, keyboard interface 1716 as interface for a keyboard, pointing device interface 1718 as an interface for a mouse or other pointing device, and miscellaneous other interfaces not shown individually, such as parallel and serial port interfaces, a universal serial bus (USB) interface, and the like.

Memory 1704 interfaces with computer bus 1702 so as to provide information stored in memory 1704 to CPU 1712 during execution of software programs such as an operating system, application programs, device drivers, and software modules that comprise program code, and/or computer-executable process steps, incorporating functionality described herein, e.g., one or more of process flows described herein. CPU 1712 first loads computer-executable process steps from storage, e.g., memory 1704, computer-readable storage medium/media 1706, removable media drive, and/or other storage device. CPU 1712 can then execute the stored process steps in order to execute the loaded computer-executable process steps. Stored data, e.g., data stored by a storage device, can be accessed by CPU 1712 during the execution of computer-executable process steps.

Persistent storage, e.g., medium/media 1706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   selecting, using at least one computing system, a plurality of digital media items, each media item of the plurality of digital media items having associated capture information identifying a location and orientation of a digital media device capturing the media item;
   generating, using the at least one computing system, a plurality of weights for each media item of the plurality of digital media items, each weight of the media item's plurality of weights corresponding to a geographic location of a plurality of geographic locations, the weight reflects an estimated inaccuracy in the identified location and orientation of the digital media device and is generated using information including the media item's identified location and orientation, the generated weight for use in determining whether a point of interest depicted in the media item is located at the geographic location, wherein the generating of the plurality of weights is dependent on a world shape used to model the Earth; and
   for each geographic location of the plurality of geographic locations, aggregating, using the at least one computing system, the plurality of weights generated for the geographic location in connection with each media item of the plurality of digital media items, an aggregated weight for a given geographic location identifying a probability that at least one point of interest is located at the given geographic location, wherein the probability is dependent on the world shape used to model the Earth.

2. The method of claim 1, the world shape is one of an ellipsoid, sphere and plane.

3. The method of claim 1, the generating a plurality of weights for each media item of the plurality of digital media items further comprising:
   for each geographic location of the plurality of geographic locations, the at least one computing system:
      generating a capture orientation inaccuracy weight for the media item using at least one statistical orientation inaccuracy model;
      generating a capture location inaccuracy weight for the media items using at least one statistical location inaccuracy model; and
      generating a combined weight for the media item by combining the capture orientation and location inaccuracies determined for the geographic location, the combined weight being one of the plurality of weights for a media item of the plurality of digital media items.

4. The method of claim 1, each media item's orientation comprising a horizontal orientation and a vertical orientation and each media item's location comprising a horizontal location and a vertical location.

5. The method of claim 4, the generating a plurality of weights for each media item of the plurality of digital media items further comprising:
   for each geographic location of the plurality of geographic locations, the at least one computing system:
      generating a horizontal orientation capture inaccuracy weight for the media item using horizontal orientation inaccuracy statistical model;
      generating a vertical orientation capture inaccuracy weight for the media item using a vertical orientation inaccuracy statistical model;
      generating an orientation capture inaccuracy weight by combining the horizontal orientation capture inaccuracy weight and the vertical orientation capture inaccuracy weight;
      generating a horizontal location capture inaccuracy weight for the media item using a horizontal location inaccuracy statistical model;
      generating a vertical location capture inaccuracy weight for the media item using a vertical location inaccuracy statistical model;
      generating a location capture inaccuracy weight by combining the horizontal location capture inaccuracy weight and the vertical location capture inaccuracy weight; and
      generating a combined weight for the geographic location by combining the orientation and location capture inaccuracies determined for the geographic location, the combined weight being one of the plurality of weights for a media item of the plurality of digital media items.

6. The method of claim 5, the horizontal location capture inaccuracy weight is dependent on a horizontal distance between the capture location and the geographic location, the vertical location capture inaccuracy weight is dependent on a vertical distance between the capture location and the geographic location, and the horizontal and vertical distances are dependent on the world shape used to model the Earth.

7. The method of claim 5, the horizontal orientation capture inaccuracy weight is dependent on a horizontal angle between the capture location and the geographic location, the vertical orientation capture inaccuracy weight is dependent on a vertical angle between the capture location and the geographic location, and the horizontal and vertical angles are dependent on the world shape used to model the Earth.

8. A system comprising:
   at least one computing device comprising one or more processors to execute and memory to store instructions to:
   select a plurality of digital media items, each media item of the plurality of digital media items having associated capture information identifying a location and orientation of a digital media device capturing the media item;

generate a plurality of weights for each media item of the plurality of digital media items, each weight of the media item's plurality of weights corresponding to a geographic location of a plurality of geographic locations, the weight reflects an estimated inaccuracy in the identified location and orientation of the digital media device and is generated using information including the media item's identified location and orientation, the generated weight for use in determining whether a point of interest depicted in the media item is located at the geographic location, wherein the generating of the plurality of weights is dependent on a world shape used to model the Earth; and for each geographic location of the plurality of geographic locations, aggregating, use the at least one computing system, the plurality of weights generated for the geographic location in connection with each media item of the plurality of digital media items, an aggregated weight for a given geographic location identifying a probability that at least one point of interest is located at the given geographic location, wherein the probability is dependent on the world shape used to model the Earth.

9. The system of claim 8, the world shape is one of an ellipsoid, sphere and plane.

10. The system of claim 8, the instructions to generate a plurality of weights for each media item of the plurality of digital media items further comprising instructions to:

for each geographic location of the plurality of geographic locations, the at least one computing system:

generate a capture orientation inaccuracy weight for the media item using at least one statistical orientation inaccuracy model;

generate a capture location inaccuracy weight for the media items using at least one statistical location inaccuracy model; and generate a combined weight for the media item by combining the capture orientation and location inaccuracies determined for the geographic location, the combined weight being one of the plurality of weights for a media item of the plurality of digital media items.

11. The system of claim 8, each media item's orientation comprising a horizontal orientation and a vertical orientation and each media item's location comprising a horizontal location and a vertical location.

12. The system of claim 11, the instructions to generate a plurality of weights for each media item of the plurality of digital media items further comprising instructions to:

for each geographic location of the plurality of geographic locations, the at least one computing system:

generate a horizontal orientation capture inaccuracy weight for the media item using horizontal orientation inaccuracy statistical model;

generate a vertical orientation capture inaccuracy weight for the media item using a vertical orientation inaccuracy statistical model;

generate an orientation capture inaccuracy weight by combining the horizontal orientation capture inaccuracy weight and the vertical orientation capture inaccuracy weight;

generate a horizontal location capture inaccuracy weight for the media item using a horizontal location inaccuracy statistical model;

generate a vertical location capture inaccuracy weight for the media item using a vertical location inaccuracy statistical model;

generate a location capture inaccuracy weight by combining the horizontal location capture inaccuracy weight and the vertical location capture inaccuracy weight; and generate a combined weight for the geographic location by combining the orientation and location capture inaccuracies determined for the geographic location, the combined weight being one of the plurality of weights for a media item of the plurality of digital media items.

13. The system of claim 12, the horizontal location capture inaccuracy weight is dependent on a horizontal distance between the capture location and the geographic location, the vertical location capture inaccuracy weight is dependent on a vertical distance between the capture location and the geographic location, and the horizontal and vertical distances are dependent on the world shape used to model the Earth.

14. The system of claim 12, the horizontal orientation capture inaccuracy weight is dependent on a horizontal angle between the capture location and the geographic location, the vertical orientation capture inaccuracy weight is dependent on a vertical angle between the capture location and the geographic location, and the horizontal and vertical angles are dependent on the world shape used to model the Earth.

15. A computer readable non-transitory storage medium for tangibly storing thereon computer readable instructions that when executed cause at least one processor to:

select a plurality of digital media items, each media item of the plurality of digital media items having associated capture information identifying a location and orientation of a digital media device capturing the media item;

generate a plurality of weights for each media item of the plurality of digital media items, each weight of the media item's plurality of weights corresponding to a geographic location of a plurality of geographic locations, the weight reflects an estimated inaccuracy in the identified location and orientation of the digital media device and is generated using information including the media item's identified location and orientation, the generated weight for use in determining whether a point of interest depicted in the media item is located at the geographic location, wherein the generating of the plurality of weights is dependent on a world shape used to model the Earth; and for each geographic location of the plurality of geographic locations, aggregating, use the at least one computing system, the plurality of weights generated for the geographic location in connection with each media item of the plurality of digital media items, an aggregated weight for a given geographic location identifying a probability that at least one point of interest is located at the given geographic location, wherein the probability is dependent on the world shape used to model the Earth.

16. The computer readable non-transitory storage medium of claim 15, the world shape is one of an ellipsoid, sphere and plane.

17. The computer readable non-transitory storage medium of claim 15, the instructions to generate a plurality of weights for each media item of the plurality of digital media items further comprising instructions to:

for each geographic location of the plurality of geographic locations, the at least one computing system:
  generate a capture orientation inaccuracy weight for the media item using at least one statistical orientation inaccuracy model;
  generate a capture location inaccuracy weight for the media items using at least one statistical location inaccuracy model; and
  generate a combined weight for the media item by combining the capture orientation and location inaccuracies determined for the geographic location, the combined weight being one of the plurality of weights for a media item of the plurality of digital media items.

18. The computer readable non-transitory storage medium of claim 15, each media item's orientation comprising a horizontal orientation and a vertical orientation and each media item's location comprising a horizontal location and a vertical location.

19. The computer readable non-transitory storage medium of claim 18, the instructions to generate a plurality of weights for each media item of the plurality of digital media items further comprising instructions to:
for each geographic location of the plurality of geographic locations, the at least one computing system:
  generate a horizontal orientation capture inaccuracy weight for the media item using horizontal orientation inaccuracy statistical model;
  generate a vertical orientation capture inaccuracy weight for the media item using a vertical orientation inaccuracy statistical model;
  generate an orientation capture inaccuracy weight by combining the horizontal orientation capture inaccuracy weight and the vertical orientation capture inaccuracy weight;
  generate a horizontal location capture inaccuracy weight for the media item using a horizontal location inaccuracy statistical model;
  generate a vertical location capture inaccuracy weight for the media item using a vertical location inaccuracy statistical model;
  generate a location capture inaccuracy weight by combining the horizontal location capture inaccuracy weight and the vertical location capture inaccuracy weight; and
  generate a combined weight for the geographic location by combining the orientation and location capture inaccuracies determined for the geographic location, the combined weight being one of the plurality of weights for a media item of the plurality of digital media items.

20. The computer readable non-transitory storage medium of claim 19, the horizontal location capture inaccuracy weight is dependent on a horizontal distance between the capture location and the geographic location, the vertical location capture inaccuracy weight is dependent on a vertical distance between the capture location and the geographic location, and the horizontal and vertical distances are dependent on the world shape used to model the Earth.

21. The computer readable non-transitory storage medium of claim 19, the horizontal orientation capture inaccuracy weight is dependent on a horizontal angle between the capture location and the geographic location, the vertical orientation capture inaccuracy weight is dependent on a vertical angle between the capture location and the geographic location, and the horizontal and vertical angles are dependent on the world shape used to model the Earth.

* * * * *